(12) United States Patent
Kanno et al.

(10) Patent No.: US 8,697,292 B2
(45) Date of Patent: Apr. 15, 2014

(54) SULFIDE SOLID ELECTROLYTE MATERIAL, BATTERY, AND METHOD FOR PRODUCING SULFIDE SOLID ELECTROLYTE MATERIAL

(75) Inventors: Ryoji Kanno, Yokohama (JP); Masaaki Hirayama, Yokohama (JP); Yuki Kato, Susono (JP); Koji Kawamoto, Miyoshi (JP); Shigenori Hama, Susono (JP); Takamasa Otomo, Susono (JP); Kunihiro Nobuhara, Susono (JP)

(73) Assignees: Tokyo Institute of Technology, Tokyo (JP); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/636,954

(22) PCT Filed: Mar. 25, 2011

(86) PCT No.: PCT/JP2011/057421
§ 371 (c)(1),
(2), (4) Date: Oct. 23, 2012

(87) PCT Pub. No.: WO2011/118801
PCT Pub. Date: Sep. 29, 2011

(65) Prior Publication Data
US 2013/0040208 A1 Feb. 14, 2013

(30) Foreign Application Priority Data

Mar. 26, 2010 (JP) ................................ 2010-073405
Jan. 18, 2011 (JP) ................................ 2011-007812

(51) Int. Cl.
*H01M 6/18* (2006.01)
(52) U.S. Cl.
USPC ............................ 429/322; 429/321; 429/304

(58) Field of Classification Search
None
See application file for complete search history.

(56) References Cited

U.S. PATENT DOCUMENTS

2007/0160911 A1 * 7/2007 Senga et al. .................. 429/322

FOREIGN PATENT DOCUMENTS

| JP | A-2003-022841 | 1/2003 |
| JP | A-2009-093995 | 4/2009 |
| JP | A-2010-030889 | 2/2010 |

OTHER PUBLICATIONS

Hayashi et al., Formation of supersonic crystals from mechanically milled Li2S-P2S5 glasses, Electrochemistry Communications 5 (2003) 111-114.*
Matsumura et al., Nickel sulfides as a cathode for all-solid-state ceramic lithium batteries, Journal of Power Sources 174 (2007) 632-636, Available online Jun. 2007.*

(Continued)

*Primary Examiner* — Patrick Ryan
*Assistant Examiner* — Jose Colucci Rios
(74) *Attorney, Agent, or Firm* — Oliff PLC

(57) ABSTRACT

The problem of the present invention is to provide a sulfide solid electrolyte material having excellent ion conductivity. The present invention solves the problem by providing a sulfide solid electrolyte material comprising an $M_1$ element (such as a Li element), an $M_2$ element (such as a Ge element and a P element), and an S element; having a peak in a position of $2\theta=29.58°\pm0.50°$ in an X-ray diffraction measurement using a CuKα line; and having an $I_B/I_A$ value of less than 0.50 when a diffraction intensity at the peak of $2\theta=29.58°\pm0.50°$ is represented by $I_A$ and a diffraction intensity at a peak of $2\theta=27.33°\pm0.50°$ is represented by $I_B$.

19 Claims, 12 Drawing Sheets

(56) References Cited

OTHER PUBLICATIONS

Kanno et al., All solid-state sheet battery using lithium inorganic solid electrolyte,thio-LISICON, Journal of Power Sources 194 (2009) 1085-1088.*

Murayama et al., "Material design of new lithium ionic conductor, thio-LISICON, in the $Li_2S$-$P_2S_5$ system," Solid State Ionics, 2004, vol. 170, pp. 173-180.

Takada et al., "Lithium ion conductive oxysulfide, $Li_3PO_4$-$Li_3PS_4$," Solid State Ionics, 2005, vol. 176, pp. 2355-2359.

Kanno et al., "Synthesis of a new lithium ionic conductor, thio-LISICON-lithium germanium sulfide system," Solid State Ionics, 2000, vol. 130, pp. 97-104.

Murayama et al., "Synthesis of New Lithium Ionic Conductor Thio-LISICON—Lithium Silicon Sulfides System," Journal of Solid State Chemistry, 2002, vol. 168, pp. 140-148.

Kanno et al., "New Lithium Solid Electrolytes, Thio-Lisicon: Materials Design Concept and Application to Solid State Battery," Solid State Ionics: Trends in the New Millennium, 2002, pp. 13-22.

Leal-Gonzalez et al., "Structure of Lithium Gallium Sulfide, $LiGaS_2$," Acta Cryst. 1990, C46, pp. 2017-2019, International Union of Crystallography.

Ahn et al., "Synthesis and Lithium Conductivities of $Li_2SiS_3$ and $Li_4SiS_4$," Mat. Res. Bull., 1989, vol. 24, pp. 889-897.

Tachez et al., "Ionic Conductivity of and Phase Transition in Lithium Thiophosphate $Li_3PS_4$," Solid State Ionics, 1984, vol. 14, pp. 181-185.

Mercier et al., "Synthese, structure cristalline et analyse vibrationnelle de l'hexathiohypodiphosphate de lithium $Li_4P_2S_6$," Journal of Solid State Chemistry, 1982, vol. 43, pp. 151-162 (with English Abstract).

Brice et al., "Chimie Minerale-Preparation et etude de deux sulfures ternaires de lithium et de phosphore: $Li_8P_2S_9$ et $Li_7PS_6$," C. R. Acad. Sc. Paris, 1976, vol. 283, pp. 581-584 (with English Abstract).

Kanno et al., "Lithium Ionic Conductor Thio-LISICON the $Li_2S$-$GeS_2$-$P_2S_5$ System," Journal of the Electrochemical Society, 2001, vol. 148 (7), pp. A742-A746.

Jun. 28, 2011 International Search Report issued in International Patent Application No. PCT/JP2011/057421.

R. Kanno, "Electrolytes: Solid Sulfide," Secondary Batteries—Lithium Rechargeable Systems, 2009, pp. 129-137.

N. Kamaya et al., "A Lithium Superionic Conductor," Nature Materials, vol. 10, Sep. 2011, pp. 682-686.

* cited by examiner

UPPER ROW : SULFIDE SOLID ELECTROLYTE MATERIAL OF THE PRESENT INVENTION
LOWER ROW : CONVENTIONAL SULFIDE SOLID ELECTROLYTE MATERIAL

FIG. 20A EXAMPLE 8
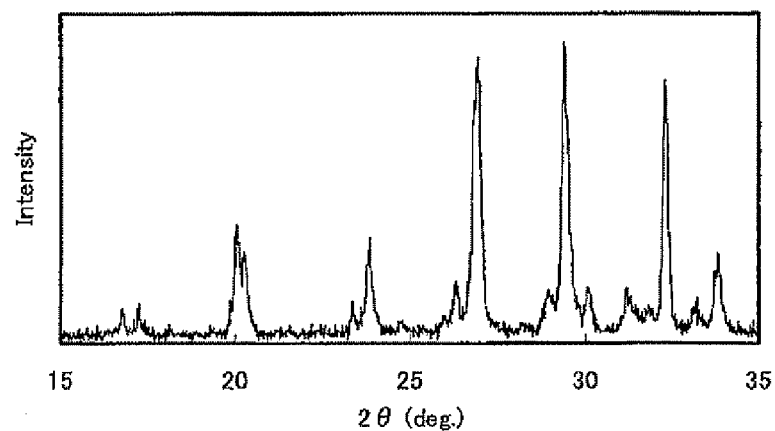
FIG. 20B EXAMPLE 9
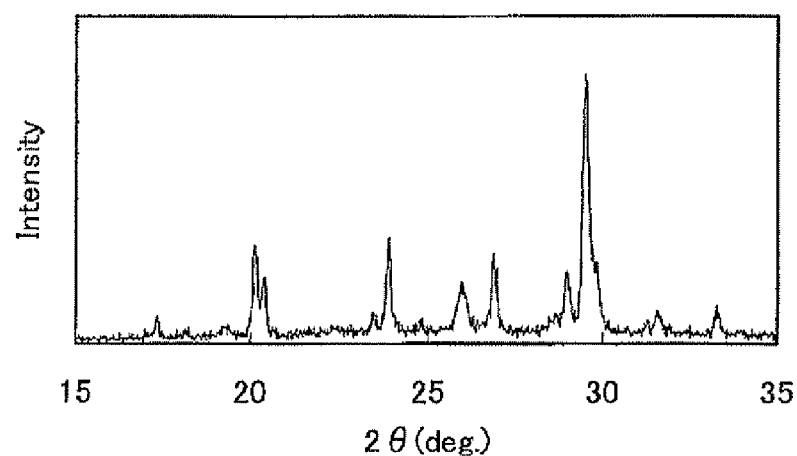
FIG. 20C EXAMPLE 10
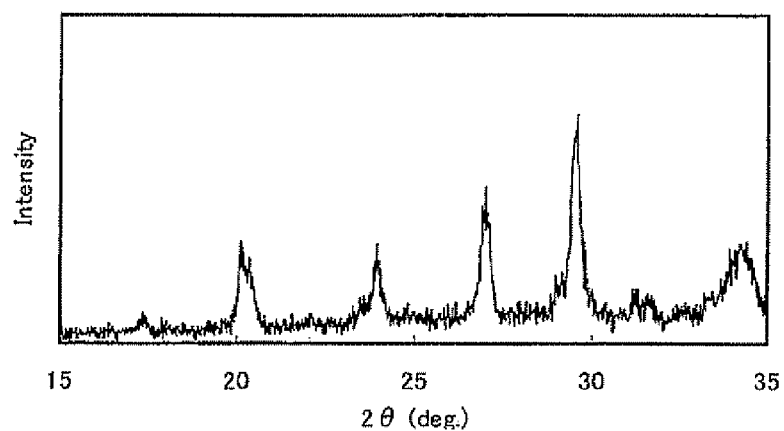

FIG. 21A  EXAMPLE 11
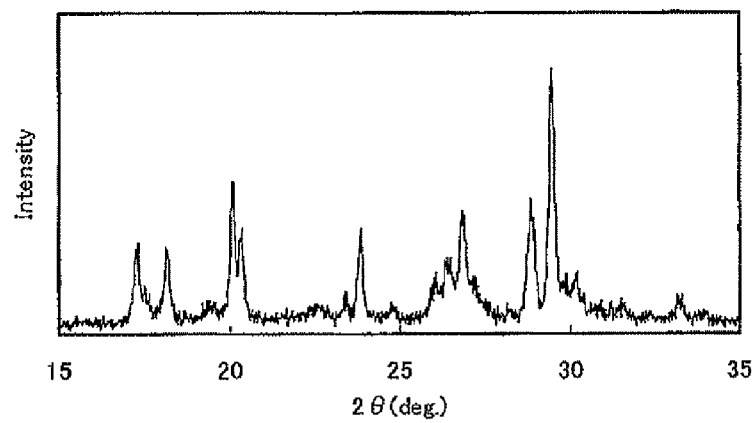
FIG. 21B  EXAMPLE 12
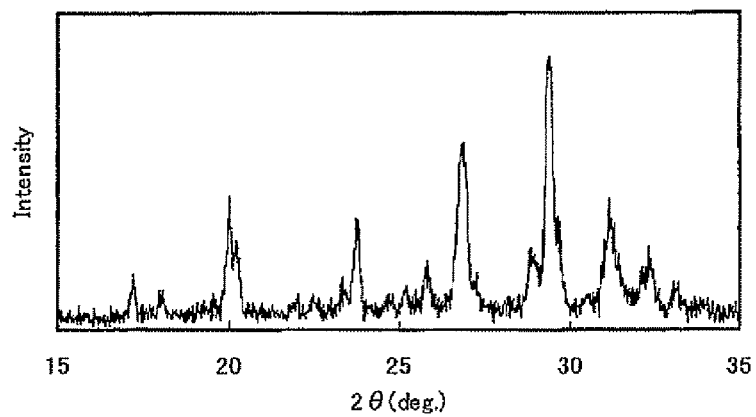
FIG. 21C  EXAMPLE 13
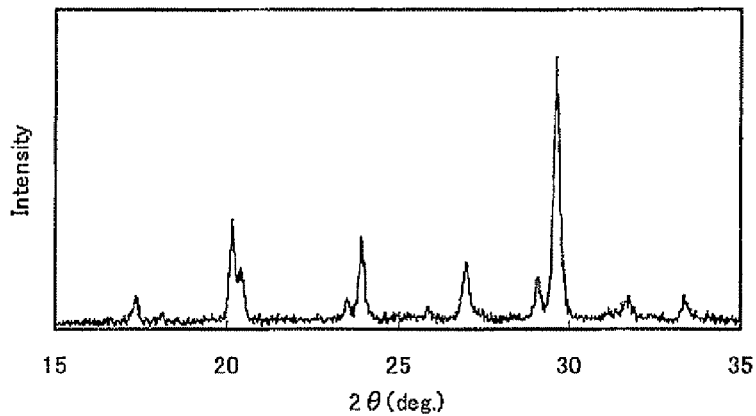

SULFIDE SOLID ELECTROLYTE MATERIAL, BATTERY, AND METHOD FOR PRODUCING SULFIDE SOLID ELECTROLYTE MATERIAL

TECHNICAL FIELD

The present invention relates to a sulfide solid electrolyte material having excellent ion conductivity.

BACKGROUND ART

In accordance with a rapid spread of information relevant apparatuses and communication apparatuses such as a personal computer, a video camera and a portable telephone in recent years, the development of a battery to be utilized as a power source thereof has been emphasized. The development of a high-output and high-capacity battery for an electric automobile or a hybrid automobile has been advanced also in the automobile industry. A lithium battery has been presently noticed from the viewpoint of a high energy density among various kinds of batteries.

Liquid electrolyte containing a flammable organic solvent is used for a presently commercialized lithium battery, so that the installation of a safety device for restraining temperature rise during a short circuit and the improvement in structure and material for preventing the short circuit are necessary therefor. On the contrary, a lithium battery all-solidified by replacing the liquid electrolyte with a solid electrolyte layer is conceived to intend the simplification of the safety device and be excellent in production cost and productivity for the reason that the flammable organic solvent is not used in the battery.

A sulfide solid electrolyte material has been known as a solid electrolyte material used for an all solid state lithium battery. For example, in Non Patent Literature 1, an Li ion conductor (a sulfide solid electrolyte material) having a composition of $Li_{4-x}Ge_{(1-x)}P_xS_4$ is disclosed. In addition, it is described in this Literature that Li ion conductance is maximized at x=0.75, and the Li ion conductance is $2.2 \times 10^{-3}$ S/cm at a temperature of 25° C. Also, in Patent Literature 1, a solid electrolyte material synthesized from $Li_2S$ and a sulfide of one kind or more selected from $P_2S_3$, $P_2S_5$, $SiS_2$, $GeS_2$, $B_2S_3$ and $Al_2S_3$ is disclosed.

CITATION LIST

Patent Literature

Patent Literature 1: Japanese Patent Application Laid-Open No. 2009-093995

Non Patent Literature

Non Patent Literature 1: Ryoji Kanno et al., "Lithium Ionic Conductor Thio-LISICON The $Li_2S$—$GeS_2$—$P_2S_5$ System", Journal of The Electrochemical Society, 148 (7) A742-A746 (2001)

SUMMARY OF INVENTION

Technical Problem

A solid electrolyte material having excellent ion conductivity has been demanded from the viewpoint of achieving higher output of a battery. The present invention has been made in view of the above-mentioned actual circumstances, and a main object thereof is to provide a sulfide solid electrolyte material having excellent ion conductivity.

Solution to Problem

To solve the above-mentioned problem, the present invention provides a sulfide solid electrolyte material comprising an $M_1$ element, an $N_2$ element, and an S element, characterized in that the above-mentioned $M_1$ is at least one kind selected from the group consisting of Li, Na, K, Mg, Ca and Zn, and the above-mentioned $M_2$ is at least one kind selected from the group consisting of P, Sb, Si, Ge, Sn, B, Al, Ga, In, Ti, Zr, V and Nb; having a peak in a position of $2\theta=29.58°\pm0.50°$ in an X-ray diffraction measurement using a CuKα line; and having an $I_B/I_A$ value of less than 0.50 when a diffraction intensity at the above-mentioned peak of $2\theta=29.58°\pm0.50°$ is represented by $I_A$ and a diffraction intensity at a peak of $2\theta=27.33°\pm0.50°$ is represented by $I_B$.

According to the present invention, the ratio of a crystal phase having a peak around $2\theta=29.58°$ is so high as to allow a sulfide solid electrolyte material having excellent ion conductivity. Thus, the use of the sulfide solid electrolyte material of the present invention allows a high-output battery.

In the present invention, the above-mentioned $I_B/I_A$ value is preferably 0.25 or less. The reason therefor is that the ratio of a crystal phase having a peak around $2\theta=29.58°$ is so high as to allow a sulfide solid electrolyte material having more excellent ion conductivity.

In the present invention, the above-mentioned sulfide solid electrolyte material preferably has a peak in positions of $2\theta=17.38°, 20.18°, 20.44°, 23.56°, 23.96°, 24.93°, 26.96°, 29.07°, 29.58°, 31.71°, 32.66°$ and $33.39°$ (these positions may shift within a range of $\pm0.50°$) in an X-ray diffraction measurement using a CuKα line.

In the present invention, it is preferable that the above-mentioned $M_1$ is Li and the above-mentioned $M_2$ is Ge and P. The reason therefor is to allow a sulfide solid electrolyte material having high Li ion conductivity.

In the present invention, the above-mentioned sulfide solid electrolyte material preferably has a composition of $Li_{(4-x)}Ge_{(1-x)}P_xS_4$ (x satisfies 0<x<1). The reason therefor is to allow a sulfide solid electrolyte material having high Li ion conductivity.

In the present invention, the above-mentioned "x" preferably satisfies $0.5 \leq x \phi 0.8$.

Also, the present invention provides a sulfide solid electrolyte material comprising as a main body a crystal structure having an octahedron O comprising an $M_1$ element and an S element, a tetrahedron $T_1$ comprising an $M_{2a}$ element and an S element, and a tetrahedron $T_2$ comprising an $M_{2b}$ element and an S element, in which the above-mentioned tetrahedron $T_1$ and the above-mentioned octahedron O share an edge, and the above-mentioned tetrahedron $T_2$ and the above-mentioned octahedron O share a corner; and characterized in that the above-mentioned $M_1$ is at least one kind selected from the group consisting of Li, Na, K, Mg, Ca and Zn, and the above-mentioned $M_{2a}$ and $M_{2b}$ are each independently at least one kind selected from the group consisting of P, Sb, Si, Ge, Sn, B, Al, Ga, In, Ti, Zr, V and Nb.

According to the present invention, a sulfide solid electrolyte material having excellent ion conductivity may be obtained for the reason that the octahedron O, the tetrahedron $T_1$ and the tetrahedron $T_2$ have the predetermined crystal structure (a three-dimensional structure). Thus, the use of the sulfide solid electrolyte material of the present invention allows a high-output battery.

In the present invention, it is preferable that the above-mentioned octahedron O is an LiS$_6$ octahedron in which the above-mentioned M$_1$ is Li, the above-mentioned tetrahedron T$_1$ is a GeS$_4$ tetrahedron and a PS$_4$ tetrahedron, in which the above-mentioned M$_{2a}$ is Ge and P respectively, and the above-mentioned tetrahedron T$_2$ is a PS$_4$ tetrahedron, in which the above-mentioned M$_{2b}$ is P.

In the present invention, it is preferable that the above-mentioned sulfide solid electrolyte material has a peak in a position of 2θ=29.58°±0.50° in an X-ray diffraction measurement using a CuKα line, and has an I$_B$/I$_A$ value of less than 0.50 when a diffraction intensity at the above-mentioned peak of 2θ=29.58°±0.50° is represented by I$_A$ and a diffraction intensity at a peak of 2θ=27.33°±0.50° is represented by I$_B$.

Also, the present invention provides a battery comprising: a cathode active material layer containing a cathode active material, an anode active material layer containing an anode active material, and an electrolyte layer formed between the above-mentioned cathode active material layer and the above-mentioned anode active material layer, characterized in that at least one of the above-mentioned cathode active material layer, the above-mentioned anode active material layer, and the above-mentioned electrolyte layer contains the above-mentioned sulfide solid electrolyte material.

According to the present invention, the use of the above-mentioned sulfide solid electrolyte material allows a high-output battery.

In the present invention, the above-mentioned electrolyte layer is preferably a solid electrolyte layer containing the above-mentioned sulfide solid electrolyte material. The reason therefor is to allow a battery having high safety as compared with a battery using liquid electrolyte.

Also, the present invention provides a method for producing a sulfide solid electrolyte material, comprising the steps of: an ion conductive material synthesizing step of synthesizing a crystalline ion conductive material by using a raw material composition containing an M$_1$ element (M$_1$ is at least one kind selected from the group consisting of Li, Na, K, Mg, Ca and Zn), an M$_2$ element (M$_2$ is at least one kind selected from the group consisting of P, Sb, Si, Ge, Sn, B, Al, Ga, In, Ti, Zr, V and Nb), and an S element; a crystallinity decreasing step of decreasing crystallinity of the above-mentioned ion conductive material by mechanical milling; and a heating step of heating the above-mentioned ion conductive material with the crystallinity decreased to obtain a sulfide solid electrolyte material having a peak in a position of 2θ=29.58°±0.50° in an X-ray diffraction measurement using a CuKα line, and having an I$_B$/I$_A$ value of less than 0.50 when a diffraction intensity at the above-mentioned peak of 2θ=29.58°±0.50° is represented by I$_A$ and a diffraction intensity at a peak of 2θ=27.33°±0.50° is represented by I$_B$.

According to the present invention, the crystallinity decreasing step and the heating step are performed in addition to the ion conductive material synthesizing step, so that a sulfide solid electrolyte material such that the ratio of a crystal phase having a peak around 2θ=29.58° is high may be obtained. Thus, a sulfide solid electrolyte material having excellent ion conductivity may be obtained.

In the present invention, the above-mentioned ion conductive material is preferably synthesized by a solid phase method in the above-mentioned ion conductive material synthesizing step. The reason therefor is to allow a crystalline ion conductive material to be easily synthesized.

In the present invention, the above-mentioned mechanical milling is preferably vibrating mill.

Also, the present invention provides a method for producing a sulfide solid electrolyte material, comprising the steps of: an ion conductive material synthesizing step of synthesizing an amorphous ion conductive material by mechanical milling using a raw material composition containing an M$_1$ element (M$_1$ is at least one kind selected from the group consisting of Li, Na, K, Mg, Ca and Zn), an N$_2$ element (M$_2$ is at least one kind selected from the group consisting of P, Sb, Si, Ge, Sn, B, Al, Ga, In, Ti, Zr, V and Nb), and an S element; and a heating step of heating the above-mentioned amorphous ion conductive material to obtain a sulfide solid electrolyte material having a peak in a position of 2θ=29.58°±0.50° in an X-ray diffraction measurement using a CuKα line, and having an I$_B$/I$_A$ value of less than 0.50 when a diffraction intensity at the above-mentioned peak of 2θ=29.58°±0.50° is represented by I$_A$ and a diffraction intensity at a peak of 2θ=27.33°±0.50° is represented by I$_B$.

According to the present invention, the amorphization is performed in the ion conductive material synthesizing step and thereafter the heating step is performed, so that a sulfide solid electrolyte material such that the ratio of a crystal phase having a peak around 2θ=29.58° is high may be obtained. Thus, a sulfide solid electrolyte material having excellent ion conductivity may be obtained.

In the present invention, the above-mentioned mechanical milling is preferably ball mill.

In the present invention, the above-mentioned raw material composition preferably contains Li$_2$S, P$_2$S$_5$ and GeS$_2$.

Advantageous Effects of Invention

The present invention produces the effect such as to allow a sulfide solid electrolyte material having excellent ion conductivity.

BRIEF DESCRIPTION OF DRAWINGS

FIGS. 20A to 20C are each an X-ray diffraction spectrum of sulfide solid electrolyte materials obtained in Examples 8 to 10.

FIGS. 21A to 21C are each an X-ray diffraction spectrum of sulfide solid electrolyte materials obtained in Examples 11 to 13.

DESCRIPTION OF EMBODIMENTS

A sulfide solid electrolyte material, a battery and a method of producing a sulfide solid electrolyte material of the present invention are hereinafter described in detail.

A. Sulfide Solid Electrolyte Material

A sulfide solid electrolyte material of the present invention is first described. The sulfide solid electrolyte material of the present invention may be roughly divided into two embodiments. Then, the sulfide solid electrolyte material of the present invention is described while divided into a first embodiment and a second embodiment.

1. First Embodiment

A sulfide solid electrolyte material of a first embodiment comprises an $M_1$ element, an $M_2$ element, and an S element, characterized in that the above-mentioned $M_1$ is at least one kind selected from the group consisting of Li, Na, K, Mg, Ca and Zn; and the above-mentioned $M_2$ is at least one kind selected from the group consisting of P, Sb, Si, Ge, Sn, B, Al, Ga, In, Ti, Zr, V and Nb; having a peak in a position of $2\theta=29.58°\pm0.50°$ in an X-ray diffraction measurement using a CuKα line; and having an $I_B/I_A$ value of less than 0.50 when a diffraction intensity at the above-mentioned peak of $2\theta=29.58°\pm0.50°$ is represented by $I_A$ and a diffraction intensity at a peak of $2\theta 27.33°\pm0.50°$ is represented by $I_B$.

According to the first embodiment, the ratio of a crystal phase having a peak around $2\theta=29.58°$ is so high as to allow a sulfide solid electrolyte material having excellent ion conductivity. Thus, the use of the sulfide solid electrolyte material of the first embodiment allows a high-output battery.

Figure 1:
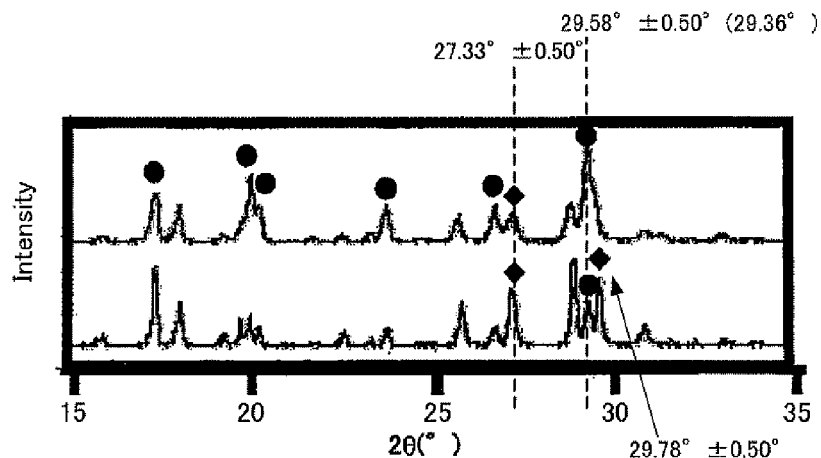
FIG. 1 is an X-ray diffraction spectrum for describing a difference between a sulfide solid electrolyte material of the present invention and a conventional sulfide solid electrolyte material.

FIG. 1 is an X-ray diffraction spectrum for describing a difference between a sulfide solid electrolyte material of the present invention (the first embodiment) and a conventional sulfide solid electrolyte material. Both of the two sulfide solid electrolyte materials in FIG. 1 have a composition of $Li_{3.25}Ge_{0.25}P_{0.75}S_4$. The sulfide solid electrolyte material of the present invention in FIG. 1 has peaks in a position of $2\theta=29.58°\pm0.50°$ and a position of $2\theta=27.33°\pm0.50°$. Also, the conventional sulfide solid electrolyte material in FIG. 1 has the same peaks. Here, it is conceived that a crystal phase having a peak around $2\theta=29.58°$ and a crystal phase having a peak around $2\theta=27.33°$ are crystal phases different from each other. In the present invention, occasionally, the crystal phase having a peak around $2\theta=29.58°$ is referred to as 'crystal phase A' and the crystal phase having a peak around $2\theta=27.33°$ is referred to as 'crystal phase B'.

In the sulfide solid electrolyte material of the present invention in FIG. 1, a characteristic peak of the crystal phase A appears strictly in a position of $2\theta=29.36°$, which differs somewhat from a position of $2\theta=29.58°$. On the other hand, as described in the after-mentioned example, in an approximately single-phase sulfide solid electrolyte material, a peak appears in a position of $2\theta=29.58°$. Thus, in the first embodiment, the characteristic peak of the crystal phase A is defined on the basis of $2\theta=29.58°$. Also, in the first embodiment, a characteristic peak of the crystal phase B appears around $2\theta=27.33°$. As shown in the lower column of FIG. 1, the crystal phase B has peaks around $2\theta=29.78°$ as well as around $2\theta=27.33°$.

Both of the crystal phases A and B are crystal phases exhibiting ion conductivity, which is different therebetween. As described in the after-mentioned example, it is conceived that the crystal phase A is remarkably high in ion conductivity as compared with the crystal phase B. In a conventional synthesis method (such as a solid phase method), the ratio of the crystal phase B low in ion conductivity may not be decreased and ion conductivity may not sufficiently be increased. On the contrary, in the first embodiment, the after-mentioned method for producing a sulfide solid electrolyte material allows the crystal phase A high in ion conductivity to be precipitated so positively as to allow a sulfide solid electrolyte material having high ion conductivity.

Also, in the first embodiment, in order to be distinguished from the conventional sulfide solid electrolyte material, it is prescribed that a diffraction intensity at a peak around $2\theta=29.58°$ is represented by $I_A$, a diffraction intensity at a peak around $2\theta=27.33°$ is represented by and an $I_B/I_A$ value is less than 0.50. It is conceived that a sulfide solid electrolyte material having an $I_B/I_A$ value of less than 0.50 may not be obtained by a conventional synthesis method. Also, in the sulfide solid electrolyte material of the first embodiment, the ratio of the crystal phase A high in ion conductivity is preferably high from the viewpoint of ion conductivity. Thus, the $I_B/I_A$ value is preferably smaller, specifically, preferably 0.45 or less, more preferably 0.25 or less, far more preferably 0.15 or less, and particularly preferably 0.07 or less. Also, the $I_B/I_A$ value is preferably 0. In other words, it is preferable that the sulfide solid electrolyte material of the first embodiment does not have a peak around $2\theta=27.33°$ as a peak of the crystal phase B.

The sulfide solid electrolyte material of the first embodiment has a peak around $2\theta=29.58°$. This peak, as described above, is one of peaks of the crystal phase A high in ion conductivity. Here, $2\theta=29.58°$ in the first embodiment is an actual measurement value obtained in the after-mentioned example, and a crystal lattice varies somewhat with factors such as a material composition and the position of a peak occasionally shifts somewhat from $2\theta=29.58°$. Thus, in the first embodiment, the above-mentioned peak of the crystal phase A is defined as a peak in a position of $29.58°\pm0.50°$. The crystal phase A is ordinarily conceived to have peaks of $2\theta=17.38°$, $20.18°$, $20.44°$, $23.56°$, $23.96°$, $24.93°$, $26.96°$, 29.07°, 29.58°, 31.71°, 32.66° and 33.39°. These peak positions also occasionally shift within a range of ±0.50°.

On the other hand, a peak around 2θ=27.33°, as described above, is one of peaks of the crystal phase B low in ion conductivity. Here, 2θ=27.33° in the first embodiment is an actual measurement value obtained in the after-mentioned example, and a crystal lattice varies somewhat with factors such as a material composition and the position of a peak occasionally shifts somewhat from 2θ=27.33°. Thus, in the first embodiment, the above-mentioned peak of the crystal phase B is defined as a peak in a position of 27.33°±0.50°. The crystal phase B is ordinarily conceived to have peaks of 2θ=17.46°, 18.12°, 19.99°, 22.73°, 25.72°, 27.33°, 29.16° and 29.78°. These peak positions also occasionally shift within a range of ±0.50°.

Also, the sulfide solid electrolyte material of the first embodiment contains an $M_1$ element, an $M_2$ element, and an S element. The above-mentioned $M_1$ is preferably a monovalent or divalent element. Examples of the $M_1$ include at least one kind selected from the group consisting of Li, Na, K, Mg, Ca and Zn. Any of these elements function as a conductive ion. Above all, in the first embodiment, the $M_1$ is preferably Li. The reason therefor is to allow a sulfide solid electrolyte material useful for a lithium battery. Also, the $M_1$ may be a monovalent element (such as Li, Na and K), part of which may be substituted with a divalent element or higher (such as Mg, Ca and Zn). Thus, the monovalent element moves so easily as to improve ion conductivity.

On the other hand, the above-mentioned $M_2$ is preferably a trivalent, tetravalent or pentavalent element. Examples of the $M_2$ include at least one kind selected from the group consisting of P, Sb, Si, Ge, Sn, B, Al, Ga, In, Ti, Zr, V and Nb. Above all, in the first embodiment, the $M_2$ is preferably at least one kind selected from the group consisting of P, Ge, Al, Zr, Sn and B, more preferably at least one of P and Ge. Also, the $M_2$ may be elements of two kinds or more.

Also, in the after-mentioned example, an LiGePS-based sulfide solid electrolyte material is actually synthesized to perform an X-ray diffraction measurement of an obtained sample, and it is confirmed that an $I_B/I_A$ value is a predetermined value or less. This LiGePS-based sulfide solid electrolyte material is such that the $M_1$ element corresponds to Li element and the $N_2$ element corresponds to Ge element and P element in the above-mentioned general formula. On the other hand, the sulfide solid electrolyte material of the first embodiment ordinarily has a specific crystal structure described in the after-mentioned second embodiment. It is guessed that any optional combination of the $M_1$, element and the $M_2$ element may have the same crystal structure as the LiGePS-based sulfide solid electrolyte material. Thus, any optional combination of the $M_1$ element and the $M_2$ element is conceived to allow a sulfide solid electrolyte material having excellent ion conductivity. Also, the position of a peak of X-ray diffraction depends on a crystal structure, so that it is conceived that a similar XRD pattern is obtained independently of kinds of the $N_1$ element and the $M_2$ element if a sulfide solid electrolyte material has the above-mentioned crystal structure.

Also, the sulfide solid electrolyte material of the first embodiment preferably contains a Li element, a Ge element, a P element and a S element. In addition, the composition of the LiGePS-based sulfide solid electrolyte material is not particularly limited if it is a composition for allowing a predetermined $I_B/I_A$ value, but preferably a composition of $Li_{(4-x)}Ge_{(1-x)}P_xS_4$ (x satisfies 0<x<1). The reason therefor is to allow a sulfide solid electrolyte material having high Li ion conductivity. Here, the composition of $Li_{(4-x)}Ge_{(1-x)}P_xS_4$ corresponds to a composition of a solid solution of $Li_3PS_4$ and $Li_4GeS_4$. That is to say, this composition corresponds to a composition on a tie line of $Li_3PS_4$ and $Li_4GeS_4$. Both $Li_3PS_4$ and $Li_4GeS_4$ correspond to an ortho composition and have the advantage that chemical stability is high. A sulfide solid electrolyte material having such a composition of $Li_{(4-x)}Ge_{(1-x)}P_xS_4$ has been conventionally known as thio-LISICON, and the sulfide solid electrolyte material of the first embodiment may be the same as conventional thio-LISICON in composition. However, as described above, the ratio of a crystal phase contained in the sulfide solid electrolyte material of the first embodiment differs completely from the ratio of a conventional crystal phase.

Also, "x" in $Li_{(4-x)}Ge_{(1-x)}P_xS_4$ is not particularly limited if it is a value for allowing a predetermined $I_B/I_A$ value; for example, "x" satisfies preferably 0.4 ɸ x, more preferably 0.5 ɸ x, and far more preferably 0.6 ɸ x. On the other hand, the "x" satisfies preferably x ɸ 0.8, more preferably x ɸ 0.75. The reason therefor is that such a range of "x" allows the $I_B/I_A$ value to be decreased further. Thus, a sulfide solid electrolyte material having more excellent Li ion conductivity may be obtained. Also, the sulfide solid electrolyte material of the first embodiment is preferably made of $Li_2S$, $P_2S_5$ and $GeS_2$.

The sulfide solid electrolyte material of the first embodiment is ordinarily a crystalline sulfide solid electrolyte material. Also, the sulfide solid electrolyte material of the first embodiment is preferably high in ion conductivity, and ion conductance of the sulfide solid electrolyte material at a temperature of 25° C. is preferably $1.0 \times 10^{-3}$ S/cm or more, and more preferably $2.3 \times 10^{-3}$ S/cm or more. Also, the shape of the sulfide solid electrolyte material of the first embodiment is not particularly limited and examples thereof include a powdery shape. In addition, the average particle diameter of the powdery sulfide solid electrolyte material is preferably within a range of 0.1 μm to 50 μm, for example.

The sulfide solid electrolyte material of the first embodiment has so high ion conductivity as to be used for optional uses in which ion conductivity is required. Above all, the sulfide solid electrolyte material of the first embodiment is preferably used for a battery. The reason therefor is to allow a great contribution to the achievement of higher output of a battery. Also, a method of producing the sulfide solid electrolyte material of the first embodiment is described in detail in the after-mentioned 'C. Method of producing sulfide solid electrolyte material'. Also, the sulfide solid electrolyte material of the first embodiment may have characteristics of the after-mentioned second embodiment or other embodiments.

2. Second Embodiment

Next, a second embodiment of a sulfide solid electrolyte material of the present invention is described. The sulfide solid electrolyte material of the second embodiment comprises as a main body a crystal structure having an octahedron O comprising an $M_1$ element and an S element, a tetrahedron $T_1$ comprising an $M_{2a}$ element and an S element, and a tetrahedron $T_2$ comprising an $M_{2b}$ element and an S element, in which the above-mentioned tetrahedron $T_1$ and the above-mentioned octahedron O share an edge, and the above-mentioned tetrahedron $T_2$ and the above-mentioned octahedron O share a corner; and characterized in that the above-mentioned $M_1$ is at least one kind selected from the group consisting of Li, Na, K, Mg, Ca and Zn, and the above-mentioned $M_{2a}$ and $M_{2b}$ are each independently at least one kind selected from the group consisting of P, Sb, Si, Ge, Sn, B, Al, Ga, In, Ti, Zr, V and Nb.

According to the second embodiment, a sulfide solid electrolyte material having excellent ion conductivity may be obtained for the reason that the octahedron O, the tetrahedron $T_1$ and the tetrahedron $T_2$ have the predetermined crystal structure (a three-dimensional structure). Thus, the use of the sulfide solid electrolyte material of the second embodiment allows a high-output battery. This crystal structure is conceived to correspond to the structure of the above-mentioned crystal phase A. Also, it is conceived that high ion conductivity is performed for the reason that a metal ion (such as a Li ion) conducts a cavity of this crystal structure.

Figure 2:
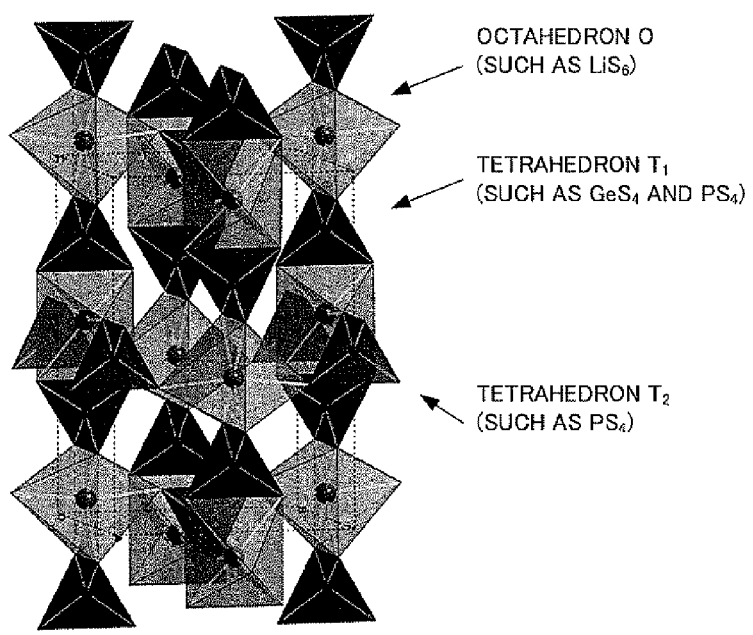
FIG. 2 is a perspective view for describing an example of a crystal structure of a sulfide solid electrolyte material of the present invention.

FIG. 2 is a perspective view for describing an example of a crystal structure of the sulfide solid electrolyte material of the second embodiment. In the crystal structure shown in FIG. 2, the octahedron O has $M_1$ as a central element, has six pieces of S at a corner of the octahedron, and is typically an $LiS_6$ octahedron. The tetrahedron $T_1$ has $M_{2a}$ as a central element, has four pieces of S at a vertex of the tetrahedron, and is typically both a $GeS_4$ tetrahedron and a $PS_4$ tetrahedron. The tetrahedron $T_2$ has $M_{2b}$ as a central element, has four pieces of S at a corner of the tetrahedron, and is typically a $PS_4$ tetrahedron. In addition, the tetrahedron $T_1$ and the octahedron O share an edge, and the tetrahedron $T_2$ and the octahedron O share a corner.

The sulfide solid electrolyte material of the second embodiment is greatly characterized by comprising the above-mentioned crystal structure as a main body. The ratio of the above-mentioned crystal structure in the total crystal structure of the sulfide solid electrolyte material is not particularly limited but preferably higher. The reason therefor is to allow a sulfide solid electrolyte material having high ion conductivity. Specifically, the ratio of the crystal structure is preferably 70 wt % or more, and more preferably 90 wt % or more. The ratio of the crystal structure may be measured by radiated light XRD, for example. In particular, the sulfide solid electrolyte material of the second embodiment is preferably a single-phase material of the above-mentioned crystal structure. The reason therefor is to allow ion conductivity to be extremely improved.

The $M_1$ element, the $M_2$ element (the $M_{2a}$ element and the $M_{2b}$ element) and other items in the second embodiment are the same as the above-mentioned first embodiment; therefore, the description herein is omitted. Also, the sulfide solid electrolyte material of the second embodiment may have characteristics of the after-mentioned other embodiments.

3. Other Embodiments

Also, a sulfide solid electrolyte material of the present invention may be the following embodiment. That is to say, the sulfide solid electrolyte material of the present invention may comprise an $M_1$ element, an $M_2$ element, and an S element, characterized in that the above-mentioned $M_1$ is at least one kind selected from the group consisting of Li, Ma, K, Mg, Ca and Zn, and the above-mentioned $M_2$ is at least one kind selected from the group consisting of P, Sb, Si, Ge, Sn, B, Al, Ga, In, Ti, Zr, V and Nb; having a peak in a position of $2\theta=29.58°\pm0.50°$ in an X-ray diffraction measurement using a CuKα line; and having an $I_C/I_A$ value of 0.20 or less when a diffraction intensity at the above-mentioned peak of $2\theta=29.58°\pm0.50°$ is represented by $I_A$ and a diffraction intensity at a peak of $2\theta=29.78°\pm0.50°$ is represented by $I_C$.

According to the above-mentioned embodiment, the ratio of a crystal phase having a peak around $2\theta=29.58°$ is so high as to allow a sulfide solid electrolyte material having excellent ion conductivity. The crystal phase A high in ion conductivity has a peak around $2\theta=29.58°$. The position of a peak which exhibits the crystal phase A may adopt $2\theta=29.36°\pm0.50°$ and $2\theta=29.36°\pm0.20°$. On the other hand, the crystal phase B low in ion conductivity, as shown in the above-mentioned FIG. 1, has peaks around $2\theta=29.78°$ as well as around $2\theta=27.33°$. The position of a peak which exhibits the crystal phase B ordinarily adopts $2\theta=29.78°\pm0.50°$ and may be $2\theta=29.78°\pm0.20°$.

Also, in the above-mentioned embodiment, in order to be distinguished from the conventional sulfide solid electrolyte material, it is prescribed that a diffraction intensity at a peak around $2\theta=29.58°$ is represented by $I_A$, a diffraction intensity at a peak around $2\theta=29.78°$ is represented by $I_C$, and an $I_C/I_A$ value is 0.20 or less. It is conceived that a sulfide solid electrolyte material having an $I_C/I_A$ value of 0.20 or less may not be obtained by a conventional synthesis method. Also, in the sulfide solid electrolyte material of the above-mentioned embodiment, the ratio of the crystal phase A high in ion conductivity is preferably high from the viewpoint of ion conductivity. Thus, the $I_C/I_A$ value is preferably smaller, specifically, preferably 0.15 or less, more preferably 0.10 or less, and far more preferably 0.07 or less. Also, the $I_C/I_A$ value is preferably 0. In other words, it is preferable that the sulfide solid electrolyte material of the above-mentioned embodiment does not have a peak around $2\theta=29.78°$ as a peak of the crystal phase B.

The $M_1$ element, the $M_2$ element and other items in the above-mentioned embodiment are the same as the above-mentioned first embodiment; therefore, the description herein is omitted.

B. Battery

Next, a battery of the present invention is described. The battery of the present invention is a battery comprising a cathode active material layer containing a cathode active material, an anode active material layer containing an anode active material, and an electrolyte layer formed between the above-mentioned cathode active material layer and the above-mentioned anode active material layer, characterized in that at least one of the above-mentioned cathode active material layer, the above-mentioned anode active material layer, and the above-mentioned electrolyte layer, contains the above-mentioned sulfide solid electrolyte material.

According to the present invention, the use of the above-mentioned sulfide solid electrolyte material allows a high-output battery.

Figure 3:
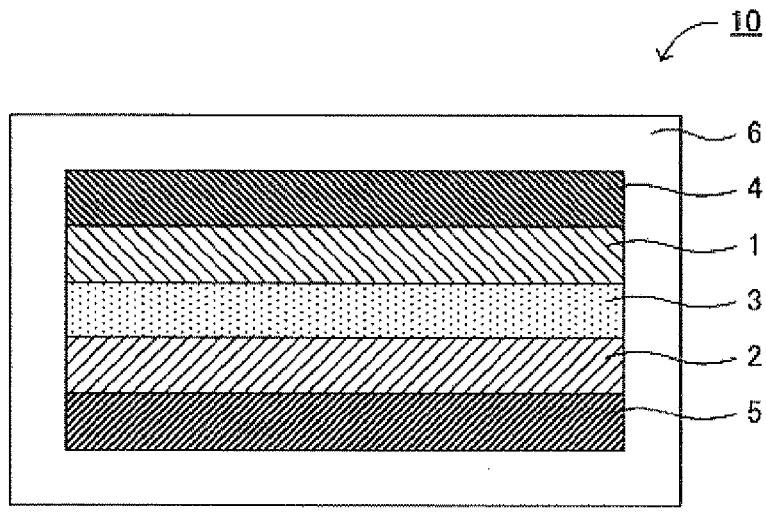
FIG. 3 is a schematic cross-sectional view showing an example of a battery of the present invention.

FIG. 3 is a schematic cross-sectional view showing an example of the battery of the present invention. A battery 10 in FIG. 3 comprises a cathode active material layer 1 containing a cathode active material, an anode active material layer 2 containing an anode active material, a electrolyte layer 3 formed between the cathode active material layer 1 and the anode active material layer 2, a cathode current collector 4 for performing current collecting of the cathode active material layer 1, an anode current collector 5 for performing current collecting of the anode active material layer 2, and a battery case 6 for storing these members. The present invention is greatly characterized in that at least one of the cathode active material layer 1, the anode active material layer 2 and the electrolyte layer 3 contains the sulfide solid electrolyte material described in the above-mentioned 'A. Sulfide solid electrolyte material'.

The battery of the present invention is hereinafter described in each constitution.

1. Electrolyte Layer

An electrolyte layer in the present invention is first described. The electrolyte layer in the present invention is a layer formed between the cathode active material layer and the anode active material layer. The electrolyte layer is not particularly limited if it is a layer for allowing ion conduction, and is preferably a solid electrolyte layer made of a solid electrolyte material. The reason therefor is to allow a battery having high safety as compared with a battery using liquid electrolyte. In addition, in the present invention, a solid electrolyte layer preferably contains the above-mentioned sulfide solid electrolyte material. The ratio of the above-mentioned sulfide solid electrolyte material contained in a solid electrolyte layer is preferably, for example, within a range of 10% by volume to 100% by volume, above all, within a range of 50% by volume to 100% by volume. In particular, in the present invention, a solid electrolyte layer is preferably made of only the above-mentioned sulfide solid electrolyte material. The reason therefor is to allow a high-output battery. The thickness of a solid electrolyte layer is preferably within a range of 0.1 μm to 1000 μm, for example, and within a range of 0.1 μm to 300 μm, above all. Examples of a method for forming a solid electrolyte layer include a method for compression-molding a solid electrolyte material.

An electrolyte layer in the present invention may be a layer made of liquid electrolyte. The case of using liquid electrolyte requires safety to be further considered as compared with the case of using a solid electrolyte layer, but allows a higher-output battery. Also, in this case, ordinarily, at least one of the cathode active material layer and the anode active material layer contains the above-mentioned sulfide solid electrolyte material. Liquid electrolyte used for a lithium battery ordinarily contains a lithium salt and an organic solvent (a non-aqueous solvent). Examples of the lithium salt include inorganic lithium salts such as $LiPF_6$, $LiBF_4$, $LiClO_4$ and $LiAsF_6$, and organic lithium salts such as $LiCF_3SO_3$, $LiN(CF_3SO_2)_2$, $LiN(C_2F_5SO_2)_2$ and $LiC(CF_3SO_2)_3$. Examples of the organic solvent include ethylene carbonate (EC), propylene carbonate (PC), dimethyl carbonate (DMC), diethyl carbonate (DEC), ethylmethyl carbonate (EMC) and butylene carbonate (BC).

2. Cathode Active Material Layer

Next, a cathode active material layer in the present invention is described. The cathode active material layer in the present invention is a layer containing at least a cathode active material, and may contain at least one of a solid electrolyte material, a conductive material and a binder, as required. In particular, in the present invention, the cathode active material layer contains a solid electrolyte material, which is preferably the above-mentioned sulfide solid electrolyte material. The reason therefor is to allow the cathode active material layer having high ion conductivity. The ratio of the above-mentioned sulfide solid electrolyte material contained in the cathode active material layer varies with kinds of a battery; preferably, for example, within a range of 0.1% by volume to 80% by volume, above all, within a range of 1% by volume to 60% by volume, and particularly, within a range of 10% by volume to 50% by volume. Examples of a cathode active material used for a lithium battery include $LiCoO_2$, $LiMnO_2$, $Li_2NiMn_3O_8$, $LiVO_2$, $LiCrO_2$, $LiFePO_4$, $LiCoPO_4$, $LiNiO_2$ and $LiNi_{1/3}Co_{1/3}Mn_{1/3}O_2$.

The cathode active material layer in the present invention may further contain a conductive material. The addition of the conductive material allows conductivity of the cathode active material layer to be improved. Examples of the conductive material include acetylene black, Ketjen Black and carbon fiber. The cathode active material layer may also contain a binder. Examples of kinds of the binder include a fluorine-containing binder such as polytetrafluoroethylene (PTFE). Also, the thickness of the cathode active material layer is preferably within a range of 0.1 μm to 1000 μm, for example.

3. Anode Active Material Layer

Next, an anode active material layer in the present invention is described. The anode active material layer in the present invention is a layer containing at least an anode active material, and may contain at least one of a solid electrolyte material, a conductive material and a binder, as required. In particular, in the present invention, the anode active material layer contains a solid electrolyte material, which is preferably the above-mentioned sulfide solid electrolyte material. The reason therefor is to allow the anode active material layer having high ion conductivity. The ratio of the above-mentioned sulfide solid electrolyte material contained in the anode active material layer varies with kinds of a battery; preferably, for example, within a range of 0.1% by volume to 80% by volume, above all, within a range of 1% by volume to 60% by volume, and particularly, within a range of 10% by volume to 50% by volume. Examples of the anode active material include a metal active material and a carbon active material. Examples of the metal active material include In, Al, Si, and Sn. On the other hand, examples of the carbon active material include mesocarbon microbeads (MCMB), high orientation property graphite (HOPG), hard carbon and soft carbon. Also, in the case where the anode active material layer contains the above-mentioned sulfide solid electrolyte material, an electric potential of the anode active material is preferably 0.3 V (vs Li) or more, and more preferably 0.5 V (vs Li) or more. When the electric potential of the anode active material is low, reduction of the sulfide solid electrolyte material occurs. A conductive material and a binder used for the anode active material layer are the same as the case of the above-mentioned cathode active material layer. Also, the thickness of the anode active material layer is preferably within a range of 0.1 μm to 1000 μm, for example.

4. Other Constitutions

A battery of the present invention comprises at least the above-mentioned electrolyte layer, cathode active material layer and anode active material layer, ordinarily further comprising a cathode current collector for collecting the current of cathode active material layer and an anode current collector for collecting the current of anode active material layer. Examples of a material for the cathode current collector include SUS, aluminum, nickel, iron, titanium and carbon, and preferably SUS among them. On the other hand, examples of a material for the anode current collector include SUS, copper, nickel and carbon, and preferably SOS among them. Factors such as the thickness and shape of the cathode current collector and the anode current collector are preferably selected properly in accordance with uses of a battery. Also, a battery case of a general battery may be used for a battery case used for the present invention. Examples of the battery case include a battery case made of SUS.

5. Battery

A battery of the present invention may be a primary battery or a secondary battery, and preferably a secondary battery among them. The reason therefor is capable of being repeatedly charged and discharged and is useful as a car-mounted battery, for example. Examples of the shape of a battery of the present invention include a coin shape, a laminate shape, a cylindrical shape and a rectangular shape. Also, a producing method for a battery of the present invention is not particularly limited if it is a method for allowing the above-mentioned battery, and the same method as a producing method for a general battery may be used. In the case where a battery of the present invention is an all solid battery, examples of a producing method therefor include a method such that a material composing a cathode active material layer, a material composing a solid electrolyte layer and a material composing an anode active material layer are sequentially pressed to thereby produce a power generating element and this power generating element is stored inside a battery case, which is crimped.

C. Method of Producing Sulfide Solid Electrolyte Material

Next, a method of producing a sulfide solid electrolyte material of the present invention is described. The method of producing a sulfide solid electrolyte material of the present invention may be roughly divided into two embodiments. Then, the method of producing a sulfide solid electrolyte material of the present invention is described while divided into a first embodiment and a second embodiment.

1. First Embodiment

A method for producing a sulfide solid electrolyte material of the first embodiment comprises steps of: an ion conductive material synthesizing step of synthesizing a crystalline ion conductive material by using a raw material composition containing an $M_1$ element ($M_1$ is at least one kind selected from the group consisting of Li, Na, K, Mg, Ca and Zn) an $M_2$ element ($M_2$ is at least one kind selected from the group consisting of P, Sb, Si, Ge, Sn, B, Al, Ga, In, Ti, Zr, V and Nb), and an S element; a crystallinity decreasing step of decreasing crystallinity of the above-mentioned ion conductive material by mechanical milling; and a heating step of heating the above-mentioned ion conductive material with the crystallinity decreased to obtain a sulfide solid electrolyte material having a peak in a position of $2\theta=29.58°\pm0.50°$ in an X-ray diffraction measurement using a CuKα line, and having an $I_B/I_A$ value of less than 0.50 when a diffraction intensity at the above-mentioned peak of $2\theta=29.58°\pm0.50°$ is represented by $I_A$ and a diffraction intensity at a peak of $2\theta=27.33°\pm0.50°$ is represented by $I_B$.

According to the first embodiment, the crystallinity decreasing step and the heating step are performed in addition to the ion conductive material synthesizing step, so that a sulfide solid electrolyte material such that the ratio of a crystal phase having a peak around $2\theta=29.58°$ is high may be obtained. Thus, a sulfide solid electrolyte material having excellent ion conductivity may be obtained.

Figure 4:
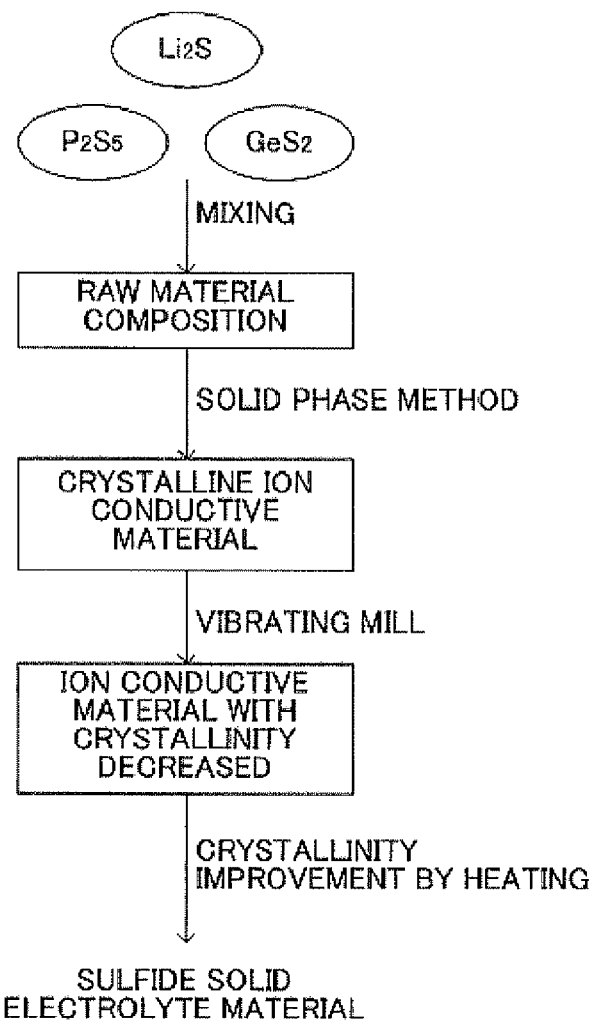
FIG. 4 is an explanatory view showing an example of a method for producing a sulfide solid electrolyte material of the present invention.

FIG. 4 is an explanatory view showing an example of the method for producing a sulfide solid electrolyte material of the first embodiment. In the method for producing a sulfide solid electrolyte material in FIG. 4, a raw material composition is first prepared by mixing $Li_2S$, $P_2S_5$ and $GeS_2$. On this occasion, the raw material composition is preferably prepared under an inert gas atmosphere in order to prevent the raw material composition from deteriorating due to moisture in the air. Next, the raw material composition is heated in a vacuum to obtain a crystalline ion conductive material by a solid phase reaction. Here, the ion conductive material in the first embodiment signifies a material before performing the after-mentioned crystallinity decreasing step and heating step. This ion conductive material is the same material as a conventional sulfide solid electrolyte material, and referred to as an ion conductive material in order to be distinguished from the sulfide solid electrolyte material of the present invention. Next, the obtained ion conductive material is pulverized by vibrating mill to decrease crystallinity of the ion conductive material. Next, the ion conductive material with the crystallinity decreased is heated again to improve the crystallinity, whereby a sulfide solid electrolyte material is obtained.

In the first embodiment, a sulfide solid electrolyte material such that the ratio of a crystal phase having a peak around $2\theta=29.58°$ is high may be obtained, and the reason therefor is described below. In the first embodiment, a treatment for decreasing crystallinity of the ion conductive material is performed after synthesizing the crystalline ion conductive material. It is conceived that this allows an environment such that the crystal phase A (the crystal phase having a peak around $2\theta=29.58°$) high in ion conductivity is easily precipitated, and the heating step thereafter allows the crystal phase A to be precipitated so positively that an $I_B/I_A$ value may be made less than 0.50 which has conventionally been impossible. The reason why the decrease of crystallinity of the ion conductive material allows an environment such that the crystal phase A is easily precipitated is not completely clear, but a possibility is conceived that a solid solution range in the ion conductive material changes by mechanical milling and an environment such that the crystal phase A is precipitated with difficulty shifts to an environment such that it is precipitated easily.

The method of producing a sulfide solid electrolyte material of the first embodiment is hereinafter described at each step.

(1) Ion Conductive Material Synthesizing Step

The ion conductive material synthesizing step in the first embodiment is first described. The ion conductive material synthesizing step in the first embodiment is a step of synthesizing a crystalline ion conductive material by using a raw material composition containing an $M_1$ element, an $M_2$ element, and an S element.

The raw material composition in the first embodiment is not particularly limited if it contains an $M_1$ element, an $M_2$ element, and an S element. The $M_1$ element and the $M_2$ element in the raw material composition are the same as the items described in the above-mentioned 'A. Sulfide solid electrolyte material'. Also, the $M_1$ element and the $M_2$ element contained in the raw material composition may be each a sulfide or a simple substance. Examples of the raw material composition include a raw material composition containing $Li_2S$, $P_2S_5$ and $GeS_2$.

Also, the composition of the raw material composition is not particularly limited if it is a composition for finally allowing a desired sulfide solid electrolyte material. Above all, the raw material composition is preferably a composition which may synthesize an ion conductive material having a peak around $2\theta=29.58°$. The reason therefor is that if the ion conductive material has a peak around $2\theta=29.58°$, a peak around $2\theta=29.58°$ is easily caused in the case of obtaining a sulfide solid electrolyte material through the after-mentioned crystallinity decreasing step and heating step.

In addition, the raw material composition preferably has a composition which may synthesize an ion conductive material having a composition of $Li_{(4-x)}Ge_{(1-x)}P_xS_4$ (x satisfies 0<x<1). The reason therefor is to allow a sulfide solid electrolyte material having high Li ion conductivity. As described above, the composition of $Li_{(4-x)}Ge_{(1-x)}P_xS_4$ corresponds to a composition of a solid solution of $Li_3PS_4$ and $Li_4GeS_4$. Here, in consideration of the case where the raw material composition contains $Li_2S$, $P_2S_5$ and $GeS_2$, the ratio of $Li_2S$ and $P_2S_5$ for obtaining $Li_3PS_4$ is $Li_2S:P_2S_5=75:25$ on a molar basis. On the other hand, the ratio of $Li_2S$ and $GeS_2$ for obtaining $Li_4GeS_4$ is $Li_2S:GeS_2=66.7:33.3$ on a molar basis. Thus, the used amount of $Li_2S$, $P_2S_5$ and $GeS_2$ is preferably determined in consideration of these ratios. Also, a preferable range of x is the same as the contents described in the above-mentioned 'A. Sulfide solid electrolyte material'.

Also, in the first embodiment, a crystalline ion conductive material is synthesized from the raw material composition. A synthesis method of the ion conductive material is not particularly limited if it is a method which allows the crystalline ion conductive material; examples thereof include a solid phase method. The solid phase method is a method for synthesizing an intended sample by a solid phase reaction through heating. Heating temperature in the solid phase method is not particularly limited if it is a temperature for causing a solid phase reaction between compounds contained in the raw material composition. The heating temperature varies with the composition of the raw material composition, and is preferably within a range of 300° C. to 1000° C., and more preferably within a range of 500° C. to 900° C., for example. Also, heating time is preferably adjusted properly so as to allow a desired ion conductive material. Also, heating in the solid phase method is preferably performed under an inert gas atmosphere or in a vacuum from the viewpoint of preventing oxidation.

(2) Crystallinity Decreasing Step

Next, the crystallinity decreasing step in the first embodiment is described. The crystallinity decreasing step in the first embodiment is a step of decreasing crystallinity of the above-mentioned ion conductive material by mechanical milling. In the first embodiment, crystallinity of the crystalline ion conductive material is once decreased, so that an environment such that the crystal phase A (the crystal phase having a peak around 2θ=29.58° high in ion conductivity is easily precipitated may be brought.

Mechanical milling is a method for pulverizing a sample while providing mechanical energy. In the first embodiment, crystallinity of the ion conductive material may be decreased by providing mechanical energy for the crystalline ion conductive material. Examples of such mechanical milling include vibrating mill, ball mill, turbo mill, mechano-fusion and disk mill; above all, vibrating mill is preferable. The conditions of vibrating mill are not particularly limited if they may decrease crystallinity of the ion conductive material. The vibration amplitude of vibrating mill is preferably, for example, within a range of 5 mm to 15 mm, and above all, within a range of 6 mm to 10 mm. The vibration frequency of vibrating mill is preferably, for example, within a range of 500 rpm to 2000 rpm, and above all, within a range of 1000 rpm to 1800 rpm. The filling rate of a sample of vibrating mill is preferably, for example, within a range of 1% by volume to 80% by volume, above all, within a range of 5% by volume to 60% by volume, and particularly, within a range of 10% by volume to 50% by volume. Also, a vibrator (such as a vibrator made of alumina) is preferably used for vibrating mill.

Also, in the first embodiment, crystallinity of the ion conductive material is preferably decreased so as to allow an environment such that the crystal phase having a peak around 2θ=29.58° is easily precipitated.

(3) Heating Step

Next, the heating step in the first embodiment is described. The heating step in the first embodiment is a step of heating the above-mentioned ion conductive material with the crystallinity decreased to obtain a sulfide solid electrolyte material having a peak in a position of 2θ=29.58°±0.50° in an X-ray diffraction measurement using a CuKα line, and having an $I_B/I_A$ value of less than 0.50 when a diffraction intensity at the above-mentioned peak of 2θ=29.58°±0.50° is represented by $I_A$ and a diffraction intensity at a peak of 2θ=27.33°±0.50° is represented by $I_B$.

In the first embodiment, the improvement of crystallinity is intended by heating the ion conductive material with the crystallinity decreased. The performance of this heating allows the crystal phase A (the crystal phase having a peak around 2θ=29.58° high in ion conductivity to be precipitated so positively that an $I_B/I_A$ value may be made less than 0.50 which has conventionally been impossible.

Heating temperature in the first embodiment is not particularly limited if it is a temperature for allowing a desired sulfide solid electrolyte material, but is preferably a temperature equal to or higher than crystallization temperature of the crystal phase A (the crystal phase having a peak around 2θ=29.58°). Specifically, the heating temperature is preferably 300° C. or more, more preferably 350° C. or more, far more preferably 400° C. or more, and particularly preferably 450° C. or more. On the other hand, the heating temperature is preferably 1000° C. or less, more preferably 700° C. or less, far more preferably 650° C. or less, and particularly preferably 600° C. or less. Also, heating time is preferably adjusted properly so as to allow a desired sulfide solid electrolyte material. Also, heating in the first embodiment is preferably performed under an inert gas atmosphere or in a vacuum from the viewpoint of preventing oxidation. Also, the sulfide solid electrolyte material obtained by the first embodiment is the same as the contents described in the above-mentioned 'A. Sulfide solid electrolyte material'; therefore, the description herein is omitted.

2. Second Embodiment

A method for producing a sulfide solid electrolyte material of the second embodiment comprises a step of: an ion conductive material synthesizing step of synthesizing an amorphous ion conductive material by mechanical milling using a raw material composition containing an $M_1$, element ($M_1$ is at least one kind selected from the group consisting of Li, Na, K, Mg, Ca and Zn), an $M_2$ element ($M_2$ is at least one kind selected from the group consisting of P, Sb, Si, Ge, Sn, B, Al, Ga, In, Ti, Zr, V and Nb), and an S element; and a heating step of heating the above-mentioned amorphous ion conductive material to obtain a sulfide solid electrolyte material having a peak in a position of 2θ=29.58°±0.50° in an X-ray diffraction measurement using a CuKα line, and having an $I_B/I_A$ value of less than 0.50 when a diffraction intensity at the above-mentioned peak of 2θ=29.58°±0.50° is represented by $I_A$ and a diffraction intensity at a peak of 2θ=27.33°±0.50° is represented by $I_B$.

According to the second embodiment, the amorphization is performed in the ion conductive material synthesizing step and thereafter the heating step is performed, so that a sulfide solid electrolyte material such that the ratio of a crystal phase having a peak around 2θ=29.58° is high may be obtained. Thus, a sulfide solid electrolyte material having excellent ion conductivity may be obtained. Also, the second embodiment has the advantage that the yield is improved for the reason that the number of operation steps may be reduced as compared with the above-mentioned producing method of the first embodiment.

Figure 5:
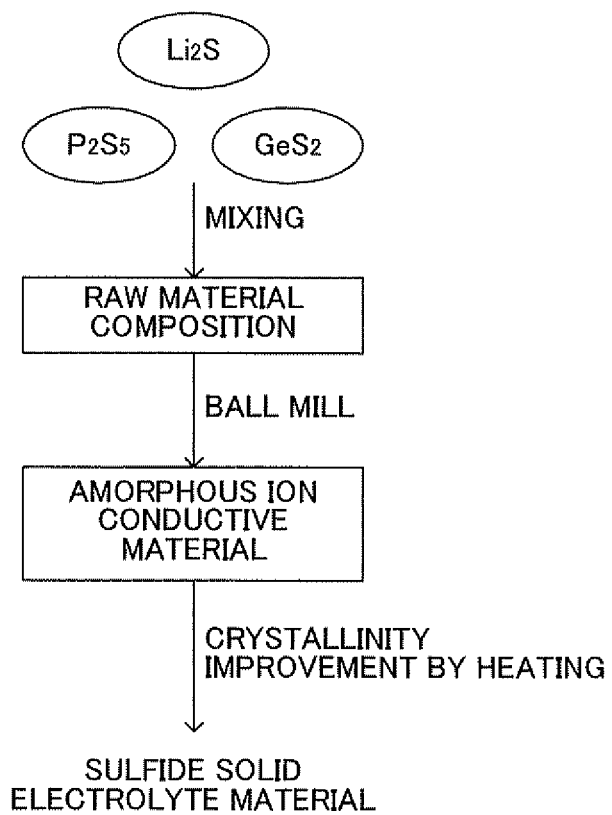
FIG. 5 is an explanatory view showing another example of a method for producing a sulfide solid electrolyte material of the present invention.

FIG. 5 is an explanatory view showing an example of the method for producing a sulfide solid electrolyte material of the second embodiment. In the method for producing a sulfide solid electrolyte material in FIG. 5, a raw material composition is first prepared by mixing $Li_2S$, $P_2S_5$ and $GeS_2$. On this occasion, the raw material composition is preferably prepared under an inert gas atmosphere in order to prevent the raw material composition from deteriorating due to moisture in the air. Next, ball mill is performed for the raw material composition to obtain an amorphous ion conductive material. Next, the amorphous ion conductive material is heated to improve crystallinity and thereby obtain a sulfide solid electrolyte material.

In the second embodiment, a sulfide solid electrolyte material such that the ratio of a crystal phase having a peak around The method of producing a sulfide solid electrolyte material of the second embodiment is hereinafter described at each step.

(1) Ion Conductive Material Synthesizing Step

The ion conductive material synthesizing step in the second embodiment is first described. The ion conductive material synthesizing step in the second embodiment is a step of synthesizing an amorphous ion conductive material by mechanical milling using a raw material composition containing an $M_1$ element, an $M_2$ element, and an S element.

The raw material composition in the second embodiment is the same as the above-mentioned raw material composition in the first embodiment; therefore, the description herein is omitted. Also, the composition of the raw material composition is not particularly limited if it is a composition for finally allowing a desired sulfide solid electrolyte material. Above all, in the case where the raw material composition contains $P_2S_5$, the composition of the raw material composition is preferably a composition which may synthesize an ion conductive material with no $P_2S_5$ remaining. The reason therefor is to bring a possibility that if $P_2S_5$ remains, $P_2S_5$ melts in the heating step thereafter to cause the crystal phase A high in ion conductivity to be precipitated with difficulty. The melting point of $P_2S_5$ is so low as approximately 270° C. that melting is caused in the heating step if $P_2S_5$ remains. It may be confirmed by a measurement such as Raman spectroscopy whether $P_2S_5$ remains in the obtained ion conductive material.

Also, mechanical milling is a method for pulverizing a sample while providing mechanical energy. In the second embodiment, an amorphous ion conductive material is synthesized by providing mechanical energy for the raw material composition. Examples of such mechanical milling include ball mill, vibrating mill, turbo mill, mechano-fusion and disk mill; above all, ball mill is preferable and planetary ball mill is particularly preferable.

Various conditions of mechanical milling are determined so as to allow a desired ion conductive material. For example, in the case of using planetary ball mill, the raw material composition and a pulverizing ball are added to treat at predetermined number of revolutions and time. Generally, larger number of revolutions brings higher generation rate of the ion conductive material, and longer treating time brings higher conversion rate from the raw material composition into the ion conductive material. The number of weighing table revolutions in performing planetary ball mill is preferably, for example, within a range of 200 rpm to 500 rpm, and above all, within a range of 250 rpm to 400 rpm. Also, the treating time in performing planetary ball mill is preferably, for example, within a range of 1 hour to 100 hours, and above all, within a range of 1 hour to 70 hours.

(2) Heating Step

The heating step in the second embodiment is a step of heating the above-mentioned amorphous ion conductive material to obtain a sulfide solid electrolyte material having a peak in a position of $2\theta=29.58°\pm0.50°$ in an X-ray diffraction measurement using a CuKα line, and having an $I_B/I_A$ value of less than 0.50 when a diffraction intensity at the above-mentioned peak of $2\theta=29.58°\pm0.50°$ is represented by $I_A$ and a diffraction intensity at a peak of $2\theta=27.33°\pm0.50°$ is represented by $I_B$. The heating step is the same as the above-mentioned heating step in the first embodiment; therefore, the description herein is omitted.

3. Other Embodiments

The above-mentioned method for producing a sulfide solid electrolyte material of each of the first embodiment and the second embodiment corresponds to a sulfide solid electrolyte material of the first embodiment described in the above-mentioned 'A. Sulfide solid electrolyte material'. The present invention may also provide a method for producing a sulfide solid electrolyte material of the following (I) to (IV) corresponding to the second embodiment and other embodiments described in the above-mentioned 'A. Sulfide solid electrolyte material'. The contents of each step in the following (I) to (IV) are the same as the contents of the above-mentioned each step.

(I) A method for producing a sulfide solid electrolyte material comprising steps of: an ion conductive material synthesizing step of synthesizing a crystalline ion conductive material by using a raw material composition containing an $M_1$ element ($M_1$ is at least one kind selected from the group consisting of Li, Na, K, Mg, Ca and Zn), an $M_{2a}$ element and an $M_{2b}$ element ($M_{2a}$ and $M_{2b}$ are each independently at least one kind selected from the group consisting of P, Sb, Si, Ge, Sn, B, Al, Ga, In, Ti, Zr, V and Nb), and an S element; a crystallinity decreasing step of decreasing crystallinity of the above-mentioned ion conductive material by mechanical milling; and a heating step of heating the above-mentioned ion conductive material with the crystallinity decreased to obtain a sulfide solid electrolyte material comprising as a main body a crystal structure having an octahedron O comprising the above-mentioned $M_1$ element and the above-mentioned S element, a tetrahedron $T_1$ comprising the above-mentioned $M_{2a}$ element and the above-mentioned S element, and a tetrahedron $T_2$ comprising the above-mentioned $M_{2b}$ element and the above-mentioned S element, in which the above-mentioned tetrahedron $T_1$ and the above-mentioned octahedron O share an edge, and the above-mentioned tetrahedron $T_2$ and the above-mentioned octahedron O share a corner.

(II) A method for producing a sulfide solid electrolyte material comprising steps of: an ion conductive material synthesizing step of synthesizing an amorphous ion conductive material by mechanical milling using a raw material composition containing an $M_1$ element ($M_1$ is at least one kind selected from the group consisting of Li, Na, K, Mg, Ca and Zn), an $M_{2a}$ element and an $M_{2b}$ element ($M_{2a}$ and $M_{2b}$ are each independently at least one kind selected from the group consisting of P, Sb, Si, Ge, Sn, B, Al, Ga, In, Ti, Zr, V and Nb), and an S element; and a heating step of heating the above-mentioned amorphous ion conductive material to obtain a sulfide solid electrolyte material comprising as a main body a crystal structure having an octahedron O comprising the above-mentioned $M_1$ element and the above-mentioned S element, a tetrahedron $T_1$ comprising the above-mentioned $M_{2a}$ element and the above-mentioned S element, and a tetrahedron $T_2$ comprising the above-mentioned $M_{2b}$ element and the above-mentioned S element, in which the above-mentioned tetrahedron $T_1$ and the above-mentioned octahedron O share an edge, and the above-mentioned tetrahedron $T_2$ and the above-mentioned octahedron O share a corner.

(III) A method for producing a sulfide solid electrolyte material comprising steps of: an ion conductive material synthesizing step of synthesizing a crystalline ion conductive material by using a raw material composition containing an $M_1$ element ($M_1$ is at least one kind selected from the group consisting of Li, Na, K, Mg, Ca and Zn), an $M_2$ element ($M_2$ is at least one kind selected from the group consisting of P, Sb, Si, Ge, Sn, B, Al, Ga, In, Ti, Zr, V and Nb), and an S element;

a crystallinity decreasing step of decreasing crystallinity of the above-mentioned ion conductive material by mechanical milling; and a heating step of heating the above-mentioned ion conductive material with the crystallinity decreased to obtain a sulfide solid electrolyte material having a peak in a position of $2\theta=29.58°\pm0.50°$ in an X-ray diffraction measurement using a CuKα line, and having an $I_C/I_A$ value of 0.20 or less when a diffraction intensity at the above-mentioned peak of $2\theta=29.58°\pm0.50°$ is represented by $I_A$ and a diffraction intensity at a peak of $2\theta=29.78°\pm0.50°$ is represented by $I_C$.

(IV) A method for producing a sulfide solid electrolyte material comprising steps of: an ion conductive material synthesizing step of synthesizing an amorphous ion conductive material by mechanical milling using a raw material composition containing an $M_1$ element ($M_1$ is at least one kind selected from the group consisting of Li, Na, K, Mg, Ca and Zn), an $M_2$ element ($M_2$ is at least one kind selected from the group consisting of P, Sb, Si, Ge, Sn, B, Al, Ga, In, Ti, Zr, V and Nb), and an S element; and a heating step of heating the above-mentioned amorphous ion conductive material to obtain a sulfide solid electrolyte material having a peak in a position of $2\theta=29.58°\pm0.50°$ in an X-ray diffraction measurement using a CuKα line, and having an $I_C/I_A$ value of 0.20 or less when a diffraction intensity at the above-mentioned peak of $2\theta=29.58°\pm0.50°$ is represented by $I_A$ and a diffraction intensity at a peak of $2\theta=29.78°\pm0.50°$ is represented by $I_C$.

The present invention is not limited to the above-mentioned embodiments. The above-mentioned embodiments are exemplification, and any is included in the technical scope of the present invention if it has substantially the same constitution as the technical idea described in the claim of the present invention and offers similar operation and effect thereto.

EXAMPLES

The present invention is described more specifically while showing examples hereinafter.

Example 1

Synthesis of Ion Conductive Material

Lithium sulfide ($Li_2S$), phosphorus pentasulfide ($P_2S_5$) and germanium sulfide ($GeS_2$) were used as a starting material. These powders were mixed in a glove box under an argon atmosphere at a ratio of $Li_2S$ of 0.7769 g, $P_2S_5$ of 0.8673 g and $GeS_2$ of 0.3558 g to obtain a raw material composition. Next, the raw material composition was molded into pellets and the obtained pellets were put in a carbon-coated quartz tube and sealed vacuously. The pressure of the quartz tube sealed vacuously was approximately 30 Pa. Next, the quartz tube was placed in a baking furnace, heated from room temperature to 700° C. over 6 hours, maintained at 700° C. for 8 hours, and thereafter cooled slowly to room temperature. Thus, a crystalline ion conductive material having a composition of $Li_{3.25}Ge_{0.25}P_{0.75}S_4$ was obtained. The above-mentioned composition corresponds to a composition of x=0.75 in $Li_{(4-X)}Ge_{(1-X)}P_XS_4$.

(Synthesis of Sulfide Solid Electrolyte Material)

Next, the obtained ion conductive material was pulverized by using vibrating mill. TI-100™ manufactured by Cosmic Mechanical Technology. Co., Ltd. was used for the vibrating mill. Specifically, approximately 2 g of the ion conductive material obtained by the above-mentioned method and a vibrator made of alumina (φ of 36.3 mm, a height of 48.9 mm) were put in a 10-mL pot and treated at the number of revolutions of 1440 rpm for 30 minutes. Thereafter, the ion conductive material with the crystallinity decreased was molded into pellets and the obtained pellets were put in a carbon-coated quartz tube and sealed vacuously. The pressure of the quartz tube sealed vacuously was approximately 30 Pa. Next, the quartz tube was placed in a baking furnace, heated from room temperature to 550° C. over 6 hours, maintained at 550° C. for 8 hours, and thereafter cooled slowly to room temperature. Thus, a crystalline sulfide solid electrolyte material having a composition of $Li_{3.25}Ge_{0.25}P_{0.75}S_4$ was obtained.

Example 2

A crystalline ion conductive material was obtained in the same manner as Example 1 except for using a mixture at a ratio of $Li_2S$ of 0.7790 g, $P_2S_5$ of 0.7986 g and $GeS_2$ of 0.4224 g as a raw material composition. The obtained ion conductive material has a composition of $Li_{3.3}Ge_{0.3}P_{0.7}S_4$ and this composition corresponds to a composition of x=0.7 in $Li_{(4-X)}Ge_{(1-X)}P_XS_4$. In addition, a crystalline sulfide solid electrolyte material having a composition of $Li_{3.3}Ge_{0.3}P_{0.7}S_4$ was obtained in the same manner as Example 1 by using this ion conductive material.

Example 3

A crystalline ion conductive material was obtained in the same manner as Example 1 except for using a mixture at a ratio of $Li_2S$ of 0.7811 g, $P_2S_5$ of 0.7329 g and $GeS_2$ of 0.4860 g as a raw material composition. The obtained ion conductive material has a composition of $Li_{3.35}Ge_{0.35}P_{0.65}S_4$ and this composition corresponds to a composition of x=0.65 in $Li_{(4-X)}Ge_{(1-X)}P_XS_4$. In addition, a crystalline sulfide solid electrolyte material having a composition of $Li_{3.35}Ge_{0.35}P_{0.65}S_4$ was obtained in the same manner as Example 1 by using this ion conductive material.

Example 4

A crystalline ion conductive material was obtained in the same manner as Example 1 except for using a mixture at a ratio of $Li_2S$ of 0.7831 g, $P_2S_5$ of 0.6685 g and $GeS_2$ of 0.5484 g as a raw material composition. The obtained ion conductive material has a composition of $Li_{3.4}Ge_{0.4}P_{0.6}S_4$ and this composition corresponds to a composition of x=0.6 in $Li_{(4-X)}Ge_{(1-X)}P_XS_4$. In addition, a crystalline sulfide solid electrolyte material having a composition of $Li_{3.4}Ge_{0.4}P_{0.6}S_4$ was obtained in the same manner as Example 1 by using this ion conductive material.

Comparative Examples 1 to 4

The crystalline ion conductive materials obtained in Examples 1 to 4 were each regarded as a comparative sample.

[Evaluations 1]

(X-ray Diffraction Measurement)

Figure 6A:
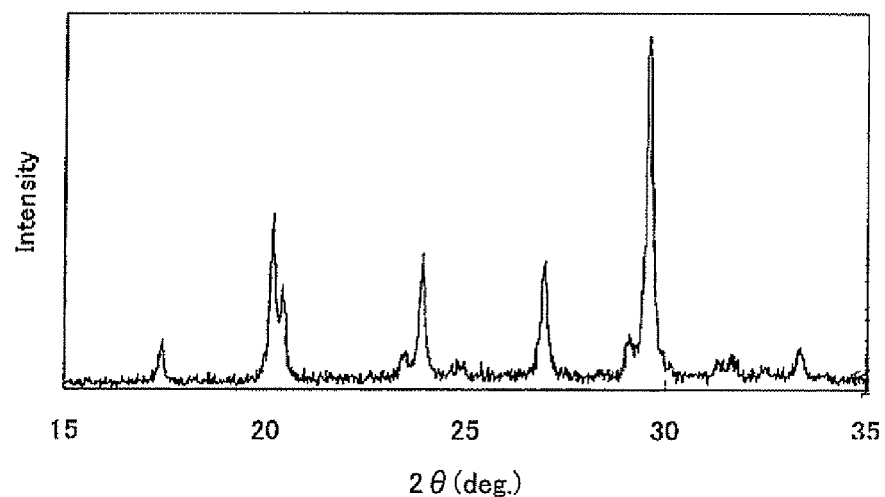
FIGS. 6A and 6B are each an X-ray diffraction spectrum of a sulfide solid electrolyte material obtained in Example 3.
Figure 6B:
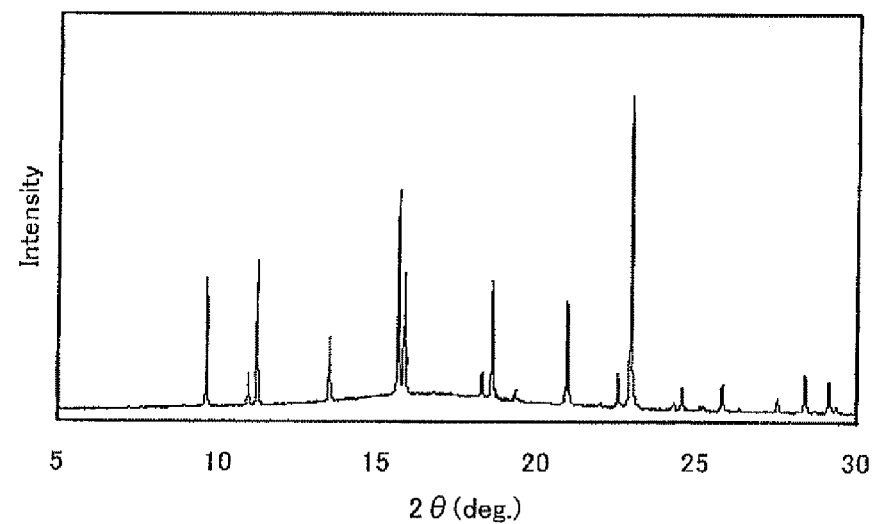

X-ray diffraction (XRD) measurement was performed by using the sulfide solid electrolyte material obtained in Example 3. The results are shown in FIGS. 6A and 6B. FIG. 6A is an XRD pattern measured by a CuKα line, and FIG. 6B is an XRD pattern measured by radiated light (a wavelength of 1.2 Å). As shown in FIGS. 6A and 6B, a single-phase sulfide solid electrolyte material was obtained in Example 3. In the case of measuring by a CuKα line, the positions of a peak were $2\theta$=17.38°, 20.18°, 20.44°, 23.56°, 23.96°, 24.93°, 26.96°, 29.07°, 29.58°, 31.71°, 32.66° and 33.39°. On the other hand, in the case of measuring by radiated light (a wavelength of 1.2 Å), the positions of a peak were 2θ=9.63°, 10.94°, 11.21°, 13.52°, 15.69°, 15.88°, 18.29°, 18.61°, 19.35°, 20.92°, 22.94°, 24.48° and 24.56°. That is to say, these peaks are conceived to be peaks of the crystal phase A high in Li ion conductivity. The above-mentioned position of the peaks may shift within a range of ±0.50° (above all, ±0.30°).

Figure 7:
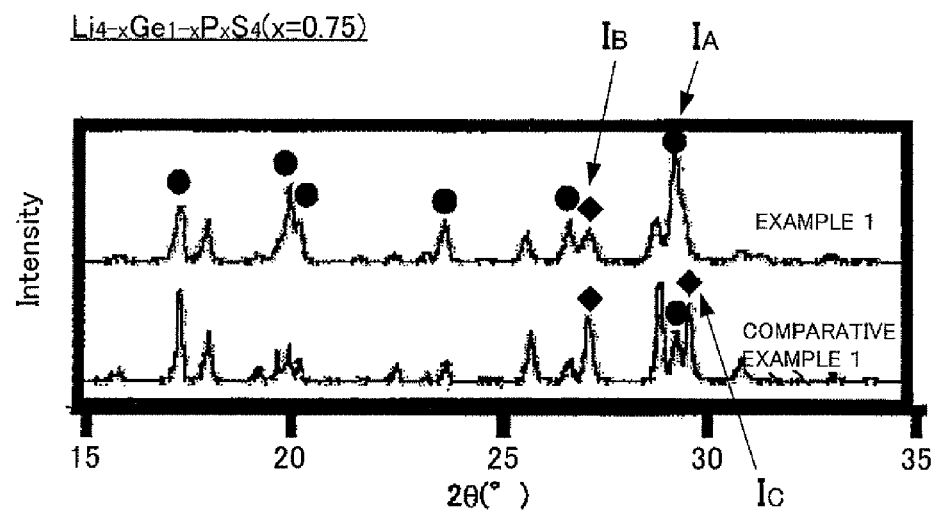
FIG. 7 is an X-ray diffraction spectrum of a sulfide solid electrolyte material obtained in Example 1 and a comparison sample obtained in Comparative Example 1.

Next, X-ray diffraction measurement (using a CuKα line) was performed by using the sulfide solid electrolyte materials obtained in Examples 1 to 4 and the comparative samples obtained in Comparative Examples 1 to 4. The results are shown in FIGS. 7 to 10. As shown in FIG. 7, the sulfide solid electrolyte material obtained in Example 1 had a peak in a position of 2θ=29.36°. This peak is a peak of the crystal phase A high in Li ion conductivity. The peak relegated to this crystal phase A is conceived to be each peak of 2θ=17.28°, 20.04°, 20.30°, 23.82°, 26.78° and 29.36° from the left in the figure.

Figure 8:
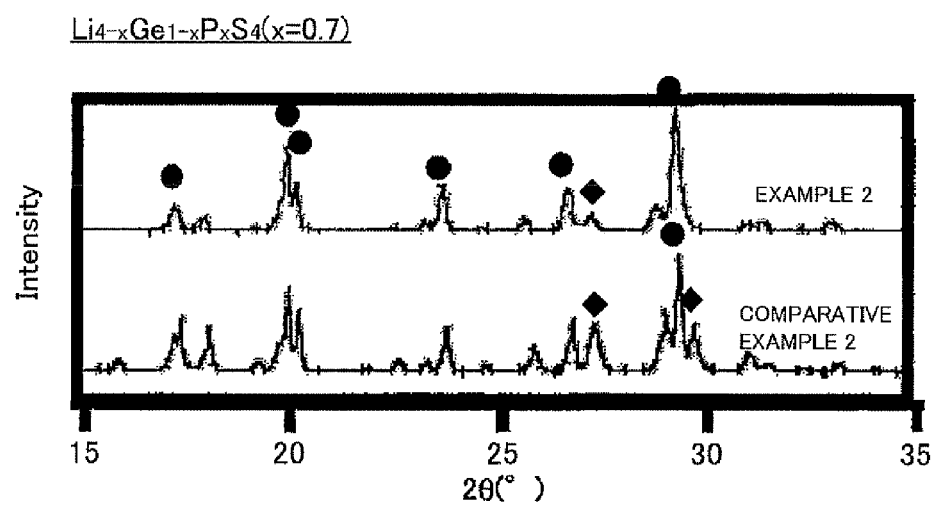
FIG. 8 is an X-ray diffraction spectrum of a sulfide solid electrolyte material obtained in Example 2 and a comparison sample obtained in Comparative Example 2.
Figure 9:
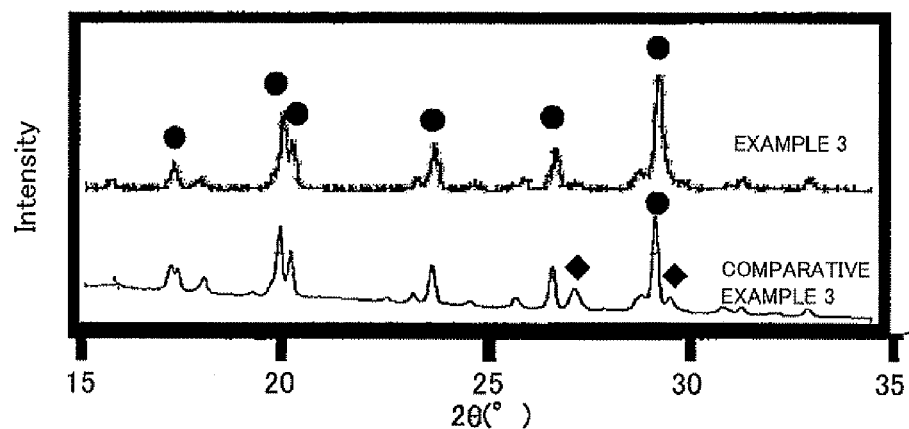
FIG. 9 is an X-ray diffraction spectrum of a sulfide solid electrolyte material obtained in Example 3 and a comparison sample obtained in Comparative Example 3.
Figure 10:
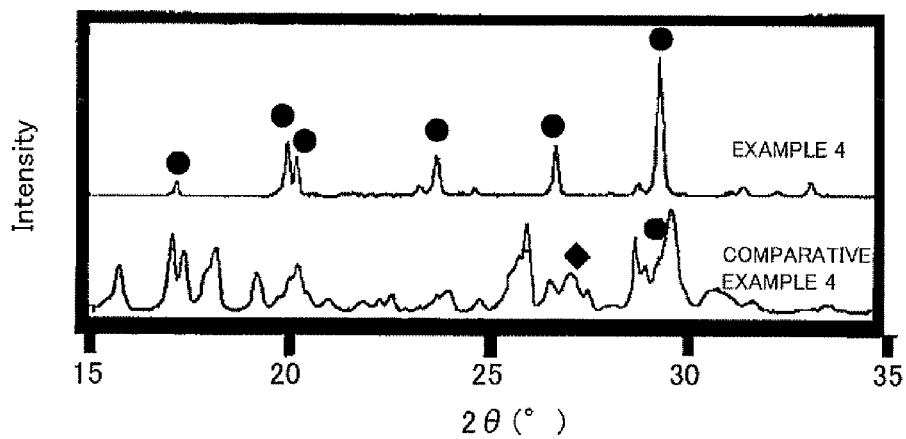
FIG. 10 is an X-ray diffraction spectrum of a sulfide solid electrolyte material obtained in Example 4 and a comparison sample obtained in Comparative Example 4.

Also, as shown in FIG. 7, a diffraction intensity at a peak around 2θ=29.58° (in the case of Example 1, 2θ=29.36° is represented by $I_A$, an intensity at a peak around 2θ=27.33° is represented by $I_B$, and a diffraction intensity at a peak around 2θ=29.78° is represented by $I_C$. In Example 1, the $I_B/I_A$ value was 0.25 and the $I_C/I_A$ value was 0.07. On the other hand, in Comparative Example 1, the $I_B/I_A$ value was 1.4 and the $I_C/I_A$ value was 1.54. Also, as shown in FIGS. 8 to 10, the sulfide solid electrolyte materials obtained in Examples 2 to 4 had a peak around 2θ=29.58° similarly. Also, the $I_B/I_A$ value and $I_C/I_A$ value in Examples 2 to 4 are described in the aftermentioned Table 1. As shown in FIG. 10, a single-phase sulfide solid electrolyte material was obtained also in Example 4 similarly to Example 3.

(X-Ray Structural Analysis)

The crystal structure of the sulfide solid electrolyte material obtained in Example 3 was identified by an X-ray structural analysis. Crystal system and crystallographic group were determined by a direct method on the basis of a diffraction pattern obtained by XRD, and thereafter the crystal structure was identified by a real space method. As a result, it was confirmed that the sulfide solid electrolyte material had the above-mentioned crystal structure as shown in FIG. 2. That is to say, the crystal structure was such that a tetrahedron $T_1$ ($GeS_4$ tetrahedron and $PS_4$ tetrahedron) and an octahedron O ($LiS_6$ octahedron) share an edge, and a tetrahedron $T_2$ ($PS_4$ tetrahedron) and the octahedron O ($LiS_6$ octahedron) share a corner. It is conceived that this crystal structure contributes to high Li conduction.

(Measurement of Li Ion Conductance)

Li ion conductance at a temperature of 25° C. was measured by using the sulfide solid electrolyte materials obtained in Examples 1 to 4 and the comparative samples obtained in Comparative Examples 1 to 4. First, a sample was weighed by a suitable amount in a glove box of an argon atmosphere, put in a polyethylene terephthalate tube (PET tube, an inside diameter of 10 mm, an outside diameter of 30 mm, a height of 20 mm), and held between powdery mold jigs made of carbon tool steel S45C anvil from the top and bottom. Next, the sample was pressed at an indication pressure of 6 MPa (a molding pressure of approximately 110 MPa) by using a uniaxial pressing machine (P-6™ manufactured by Rikenseiki, Co., Ltd.), and molded into pellets with a diameter of 10 mm and an optional thickness. Next, gold dust (manufactured by The Nilaco Corporation, treelike, a particle diameter of approximately 10 μm) was mounted on each of both sides of the pellets by 13 mg to 15 mg, uniformly dispersed on the pellet surface, and molded at an indication pressure of 30 MPa (a molding pressure of approximately 560 MPa). Thereafter, the obtained pellets were put in a closed electrochemical cell which may maintain an argon atmosphere.

An impedance gain-phase analyzer (solartron 1260™) manufactured by Solartron was used as a frequency response analyzer FRA (Frequency Response Analyzer) for measurement, and a small-sized environmental tester (Espec corp. SU-241™, −40° C. to 150° C.) was used as a constant temperature unit. The measurement was started from a high frequency range on the conditions of an alternating voltage of 10 mV to 1000 mV, a frequency range of 1 Hz to 10 MHz, an elapsed time of 0.2 second and a temperature of 23° C. Zplot™ was used for measurement software and Zview™ was used for analysis software. The obtained results are shown in Table 1.

TABLE 1

| | Composition | $I_B/I_A$ | $I_C/I_A$ | Li ion conductance (S/cm) |
|---|---|---|---|---|
| Example 1 | $Li_{3.25}Ge_{0.25}P_{0.75}S_4$ | 0.25 | 0.07 | $3.6 \times 10^{-3}$ |
| Comparative Example 1 | $Li_{3.25}Ge_{0.25}P_{0.75}S_4$ | 1.40 | 1.54 | $2.2 \times 10^{-3}$ |
| Example 2 | $Li_{3.3}Ge_{0.3}P_{0.7}S_4$ | 0.07 | 0.03 | $3.7 \times 10^{-3}$ |
| Comparative Example 2 | $Li_{3.3}Ge_{0.3}P_{0.7}S_4$ | 0.50 | 0.41 | $2.0 \times 10^{-3}$ |
| Example 3 | $Li_{3.35}Ge_{0.35}P_{0.65}S_4$ | 0 | 0.05 | $2.8 \times 10^{-3}$ |
| Comparative Example 3 | $Li_{3.35}Ge_{0.35}P_{0.65}S_4$ | 0.51 | 0.21 | $1.4 \times 10^{-3}$ |
| Example 4 | $Li_{3.4}Ge_{0.4}P_{0.6}S_4$ | 0 | 0 | $8.0 \times 10^{-3}$ |
| Comparative Example 4 | $Li_{3.4}Ge_{0.4}P_{0.6}S_4$ | 0.51 | 2.24 | $2.3 \times 10^{-3}$ |

Figure 11:
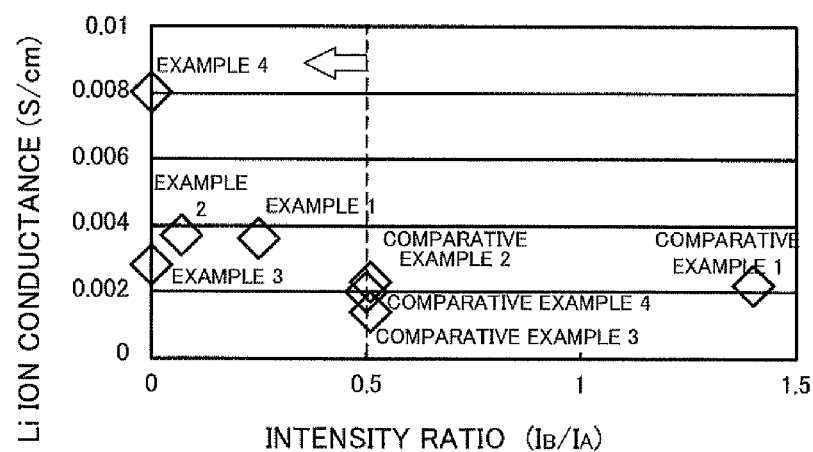
FIG. 11 is a result of measuring Li ion conductance of sulfide solid electrolyte materials obtained in Examples 1 to 4 and comparison samples obtained in Comparative Examples 1 to 4.
Figure 12:
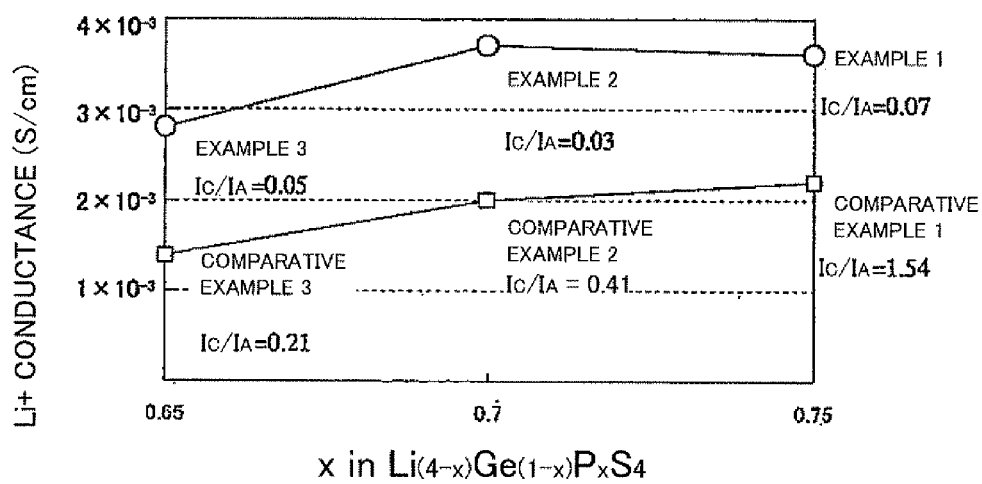
FIG. 12 is a result of measuring Li ion conductance of sulfide solid electrolyte materials obtained in Examples 1 to 3 and comparison samples obtained in Comparative Examples 1 to 3.

As shown in Table 1, each of Examples 1 to 4 exhibited high Li ion conductance as compared with Comparative Examples 1 to 4. Thus, it was confirmed that Li ion conductivity was improved when the ratio of a crystal phase having a peak around 2θ=29.58° became high and the $I_B/I_A$ value became small. As shown in Table 1, in the ion conductive material produced by a solid phase method as a conventional method, the $I_B/I_A$ value could not be made less than 0.50 and the $I_C/I_A$ value could not be made 0.20 or less. Also, FIG. 11 is a graph showing a relation between intensity ratio ($I_B/I_A$) and Li ion conductance in Examples 1 to 4 and Comparative Examples 1 to 4. As shown in FIG. 11, it might be confirmed that Li ion conductance became high in the case where the $I_B/I_A$ value was less than 0.50. Also, as shown in FIG. 12, each of Examples 1 to 3 exhibited high Li ion conductance as compared with Comparative Examples 1 to 3.

Reference Examples 1 to 3

Examples 1 to 3 were each regarded as a reference sample.

Reference Example 4

A crystalline ion conductive material was obtained in the same manner as Example 1 except for using a mixture at a ratio of $Li_2S$ of 0.7747 g, $P_2S_5$ of 0.9370 g and $GeS_2$ of 0.2883 g as a raw material composition. The obtained ion conductive material has a composition of $Li_{3.2}Ge_{0.2}P_{0.8}S_4$ and this composition corresponds to a composition of x=0.8 in $Li_{(4-X)}Ge_{(1-X)}P_XS_4$. This ion conductive material was regarded as a reference sample.

[Evaluations 2]

Figure 13:
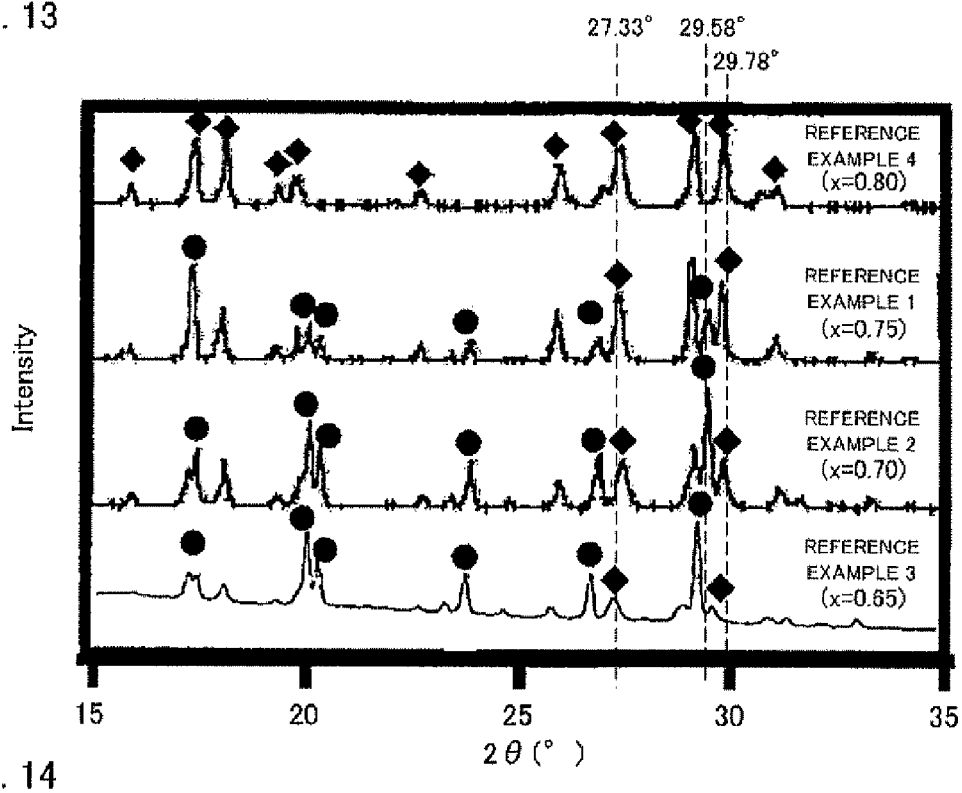
FIG. 13 is an X-ray diffraction spectrum of reference samples obtained in Reference Examples 1 to 4.
Figure 14:
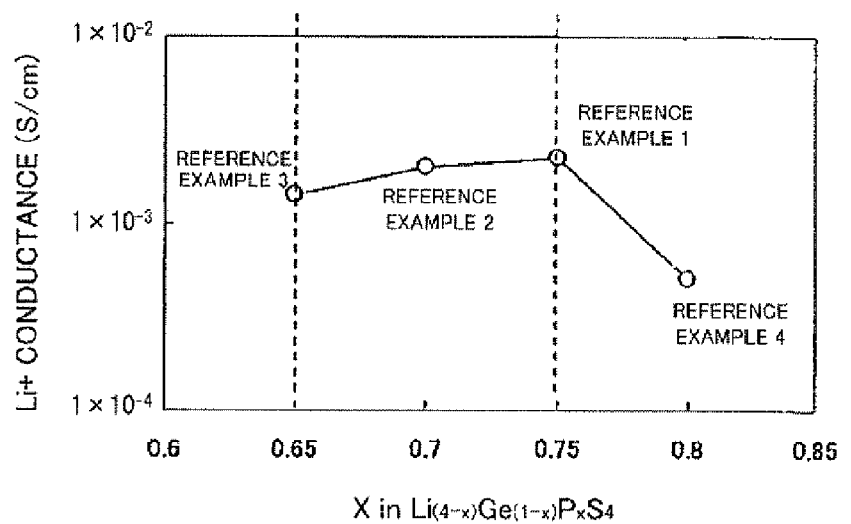
FIG. 14 is a result of measuring Li ion conductance of reference samples obtained in Reference Examples 1 to 4.

X-ray diffraction measurement and Li ion conductance measurement were performed by using the reference samples obtained in Reference Examples 1 to 4. The results are shown in FIGS. 13 and 14 respectively. As shown in FIG. 13, when the value of "x" increases, it is found that a diffraction intensity at a peak around 2θ=29.58° becomes small and a diffraction intensity at peaks around 2θ=27.33° and around 2θ=29.78° becomes large. This reveals that the ratio of the crystal phase B low in Li ion conductivity becomes relatively high while the value of "x" increases. In particular, in Reference Example 4, the crystal phase A having a peak around 2θ=29.58° completely vanishes and only a peak of the crystal phase B is confirmed. Then, when FIG. 14 is observed, Li ion conductance of Reference Example 4 is remarkably low as compared with Li ion conductance of Reference Examples 1 to 3. Thus, it is suggested that the crystal phase A of the reference samples of Reference Examples 1 to 3 is notably higher in Li ion conductivity than the crystal phase B. It might be confirmed from this fact that the sulfide solid electrolyte material of the present invention containing a large amount of the crystal phase A had high Li ion conductivity.

Example 5

Lithium sulfide ($Li_2S$), phosphorus pentasulfide ($P_2S_5$) and germanium sulfide ($GeS_2$) were used as a starting material. These powders were mixed in a glove box under an argon atmosphere at a ratio of $Li_2S$ of 0.3934 g, $P_2S_5$ of 0.2719 g and $GeS_2$ of 0.3346 g to obtain a raw material composition. Next, the raw material composition of 1 g was put in a pot (45 ml) made of zirconia with zirconia ball (10 mmϕ, 10 pieces) to completely seal the pot (an argon atmosphere). This pot was mounted on a planetary ball milling machine (P7™ manufactured by Fritsch Japan Co., Ltd.) to perform mechanical milling for 60 hours at the number of weighing table revolutions of 370 rpm. Thus, an amorphous ion conductive material having a composition of $Li_{3.5}Ge_{0.5}P_{0.5}S_4$ was obtained. The above-mentioned composition corresponds to a composition of x=0.5 in $Li_{(4-X)}Ge_{(1-X)}P_XS_4$.

Next, the obtained ion conductive material was molded into pellets and the obtained pellets were put in a carbon-coated quartz tube and sealed vacuously. The pressure of the quartz tube sealed vacuously was approximately 30 Pa. Next, the quartz tube was placed in a baking furnace, heated from room temperature to 550° C. over 6 hours, maintained at 550° C. for 8 hours, and thereafter cooled slowly to room temperature. Thus, a crystalline sulfide solid electrolyte material having a composition of $Li_{3.5}Ge_{0.5}P_{0.5}S_4$ was obtained.

Comparative Example 5-1

The amorphous ion conductive material obtained in Example 5 was regarded as a comparative sample.

Comparative Example 5-2

A comparative sample was obtained in the same manner as Example 5 except for heating from room temperature to 300° C. over 6 hours, maintaining at 300° C. for 8 hours, and thereafter cooling slowly to room temperature as the baking conditions.

Comparative Example 5-3

A comparative sample was obtained in the same manner as Example 5 except for heating from room temperature to 700° C. over 6 hours, maintaining at 700° C. for 8 hours, and thereafter cooling slowly to room temperature as the baking conditions.

Example 6

An amorphous ion conductive material was obtained in the same manner as Example 5 except for using a mixture at a ratio of $Li_2S$ of 0.3905 g, $P_2S_5$ of 0.3666 g and $GeS_2$ of 0.2429 g as a raw material composition. The obtained ion conductive material has a composition of $Li_{3.35}Ge_{0.35}P_{0.65}S_4$ and this composition corresponds to a composition of x=0.65 in $Li_{(4-X)}Ge_{(1-X)}P_XS_4$. In addition, a crystalline sulfide solid electrolyte material having a composition of $Li_{3.35}Ge_{0.35}P_{0.65}S_4$ was obtained in the same manner as Example 5 by using this ion conductive material.

Comparative Example 6

The amorphous ion conductive material obtained in Example 6 was regarded as a comparative sample.

Example 7

An amorphous ion conductive material was obtained in the same manner as Example 5 except for using a mixture at a ratio of $Li_2S$ of 0.3895 g, $P_2S_5$ of 0.3997 g and $GeS_2$ of 0.2108 g as a raw material composition. The obtained ion conductive material has a composition of $Li_{3.3}Ge_{0.3}P_{0.7}S_4$ and this composition corresponds to a composition of x=0.7 in $Li_{(4-X)}Ge_{(1-X)}P_XS_4$. In addition, a crystalline sulfide solid electrolyte material having a composition of $Li_{3.3}Ge_{0.3}P_{0.7}S_4$ was obtained in the same manner as Example 5 by using this ion conductive material.

Comparative Example 7

Figure 15:
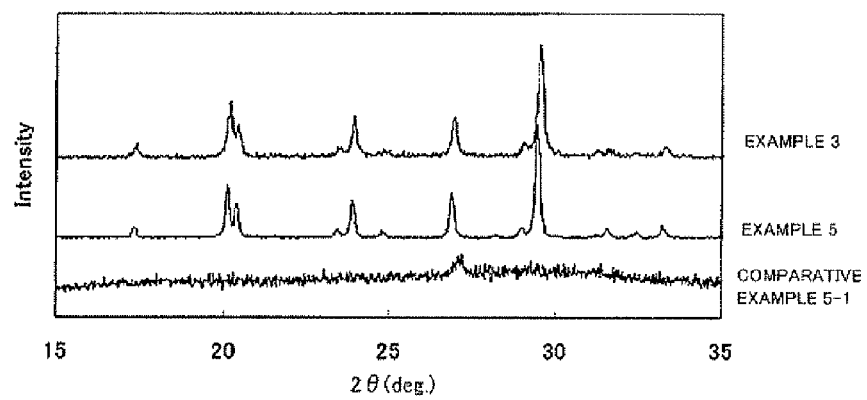
FIG. 15 is an X-ray diffraction spectrum of a sulfide solid electrolyte material obtained in Example 5 and a comparison sample obtained in Comparative Example 5-1.
Figure 16:
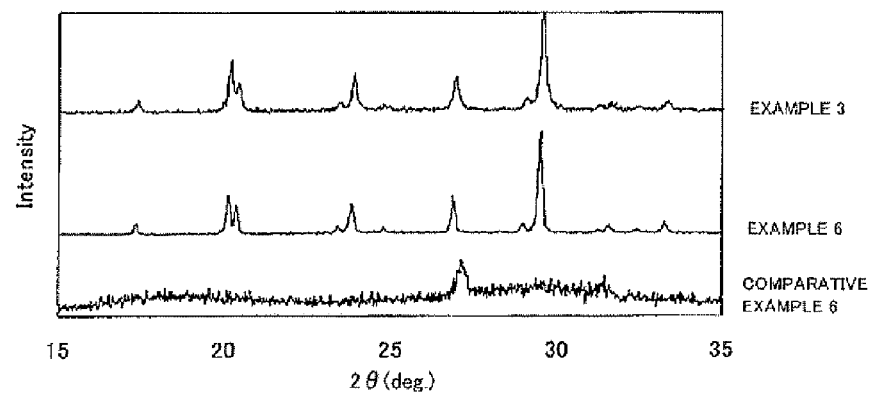
FIG. 16 is an X-ray diffraction spectrum of a sulfide solid electrolyte material obtained in Example 6 and a comparison sample obtained in Comparative Example 6.
Figure 17:
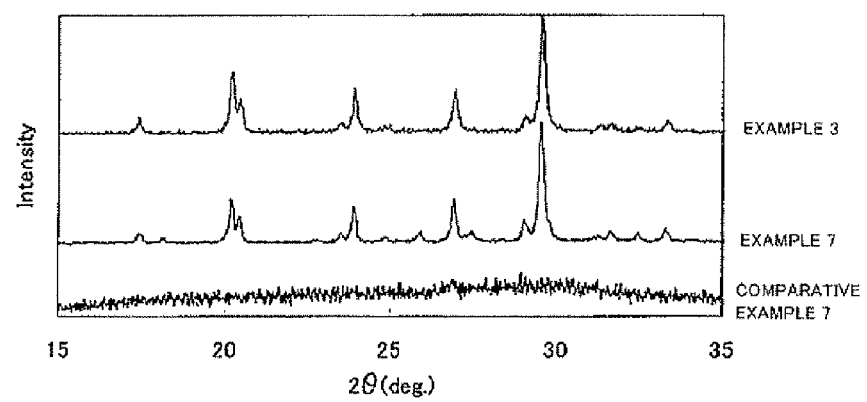
FIG. 17 is an X-ray diffraction spectrum of a sulfide solid electrolyte material obtained in Example 7 and a comparison sample obtained in Comparative Example 7.

The amorphous ion conductive material obtained in Example 7 was regarded as a comparative sample.
[Evaluations 3]
(X-Ray Diffraction Measurement)
X-ray diffraction measurement (using a CuKα line) was performed by using the sulfide solid electrolyte materials obtained in Examples 5 to 7 and the comparative samples obtained in Comparative Examples 5-1, 5-2, 5-3, 6 and 7. The results are shown in FIGS. 15 to 18. First, as shown in FIGS. 15 to 17, it was confirmed that the comparative samples obtained in Comparative Examples 5-1, 6 and 7 were amorphized approximately completely while a peak of $Li_2S$ was detected slightly. On the other hand, it was confirmed that any of the sulfide solid electrolyte materials obtained in Examples 5 to 7 had the same peak as the above-mentioned Example 3 and was a single-phase sulfide solid electrolyte material.

Figure 18:
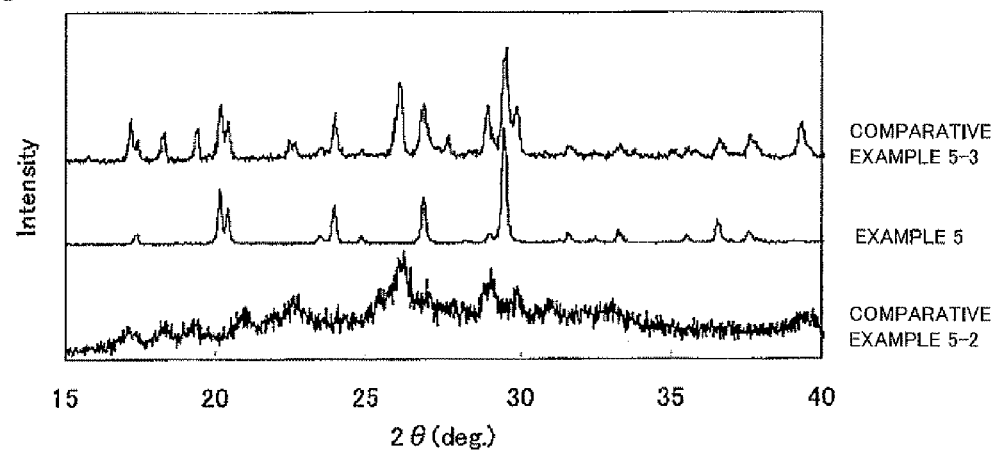
FIG. 18 is an X-ray diffraction spectrum of a sulfide solid electrolyte material obtained in Example 5 and comparison samples obtained in Comparative Examples 5-2 and 5-3.

Next, as shown in FIG. 18, the crystal phase A high in Li ion conductivity was not precipitated in Comparative Example 5-2 (heating at 300° C.), and a phase except the crystal phase A high in Li ion conductivity was precipitated in Comparative Example 5-3 (heating at 700° C.). Through this fact, the heating temperature is preferably within a range higher than 300° C. and lower than 700° C.

(Measurement of Li Ion Conductance)
Li ion conductance was measured by using the sulfide solid electrolyte materials obtained in Examples 5 to 7 and the comparative samples obtained in Comparative Examples 5-1, 6 and 7. The measuring method is the same as the above. The results are shown in Table 2. As shown in Table 2, each of Examples 5 to 7 exhibited high Li ion conductance.

TABLE 2

| | Composition | $I_B/I_A$ | Li ion conductance (S/cm) |
|---|---|---|---|
| Example 5 | $Li_{3.5}Ge_{0.5}P_{0.5}S_4$ | 0 | $8.0 \times 10^{-3}$ |
| Comparative Example 5-1 | $Li_{3.5}Ge_{0.5}P_{0.5}S_4$ | — | $1.7 \times 10^{-4}$ |
| Example 6 | $Li_{3.35}Ge_{0.35}P_{0.65}S_4$ | 0 | $8.2 \times 10^{-3}$ |

TABLE 2-continued

| | Composition | $I_B/I_A$ | Li ion conductance (S/cm) |
|---|---|---|---|
| Comparative Example 6 | $Li_{3.35}Ge_{0.35}P_{0.65}S_4$ | — | $1.8 \times 10^{-4}$ |
| Example 7 | $Li_{3.3}Ge_{0.3}P_{0.7}S_4$ | 0 | $4.2 \times 10^{-3}$ |
| Comparative Example 7 | $Li_{3.3}Ge_{0.3}P_{0.7}S_4$ | — | $1.8 \times 10^{-4}$ |

(Raman Spectroscopy Measurement)

Figure 19A:
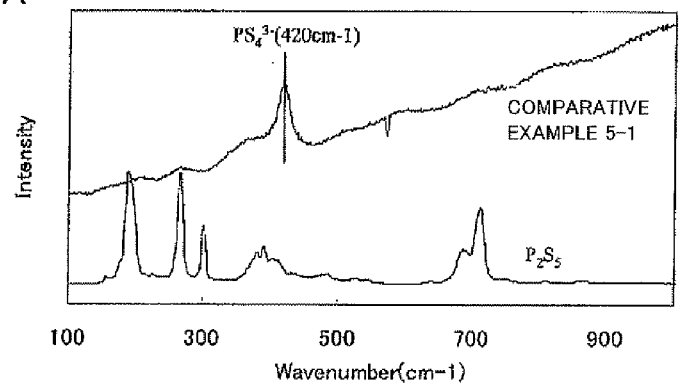
FIGS. 19A and 19B are each a Raman optical spectrum of comparison samples obtained in Comparative Examples 5-1 and 6.
Figure 19B:
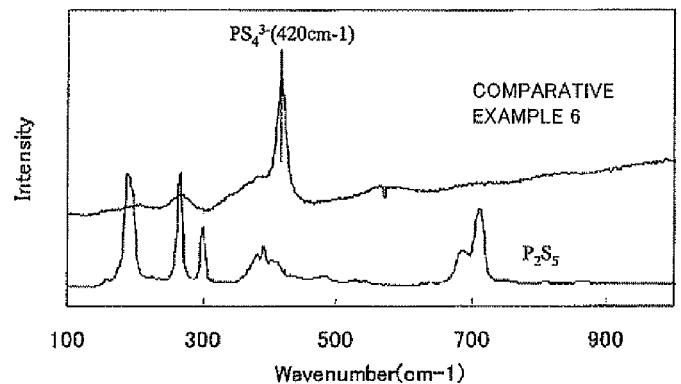

Raman spectroscopy measurement was performed for the comparative samples obtained in Comparative Examples 5-1 and 6. Nanofinder SOLAR T II™ manufactured by Tokyo Instruments, Inc. was used for Raman spectroscopy measurement. The results are shown in FIGS. 19A and 19B. As shown in FIGS. 19A and 19B, with regard to the comparative samples obtained in Examples 5-1 and 6, a peak of $P_2S_5$ was not detected and a vibration of $PS_4^{3-}$ was detected around 420 $cm^{-1}$. It was confirmed from this fact that all $P_2S_5$ of the raw material reacted with $Li_2S$ by ball mill and was converted into chemically stable $PS_4^{3-}$. Also, $P_2S_5$ was converted into $PS_4^{3-}$, so that a sign that $P_2S_5$ melted after baking was not observed in Examples 5 and 6.

Example 8

Lithium sulfide ($Li_2S$), phosphorus pentasulfide ($P_2S_5$), phosphorus trisulfide ($P_2S_3$) and germanium sulfide ($GeS_2$) were used as a starting material. These powders were mixed in a glove box under an argon atmosphere at a ratio of $Li_2S$ of 0.88053 g, $P_2S_5$ of 0.567952 g, $P_2S_3$ of 0.20204 g and $GeS_2$ of 0.3494 g to obtain a raw material composition. Next, the raw material composition of 2 g was put in a pot (45 ml) made of zirconia with zirconia ball (10 mmφ, 10 pieces) to completely seal the pot (an argon atmosphere). This pot was mounted on a planetary ball milling machine (P7™ manufactured by Fritsch Japan Co., Ltd.) to perform mechanical milling for 40 hours at the number of weighing table revolutions of 370 rpm. Thus, an amorphous ion conductive material having a composition of $Li_{3.75}Ge_{0.25}P(III)_{0.25}P(V)_{0.5}S_4$ was obtained.

Next, the obtained ion conductive material was put in a vessel made of aluminum, heated from room temperature to 550° C. under an Ar gas flow (80 mL/min) at 10° C./min, and thereafter cooled from 550° C. to room temperature at 10° C./min. Thus, a crystalline sulfide solid electrolyte material having a composition of $Li_{3.75}Ge_{0.25}P(III)_{0.25}P(V)_{0.5}S_4$ was obtained.

Example 9

Lithium sulfide ($Li_2S$), phosphorus pentasulfide ($P_2S_5$), aluminum sulfide ($Al_2S_3$) and germanium sulfide ($GeS_2$) were used as a starting material. These powders were mixed in a glove box under an argon atmosphere at a ratio of $Li_2S$ of 0.88504 g, $P_2S_5$ of 0.570864 g, $Al_2S_3$ of 0.192826 g and $GeS_2$ of 0.351267 g to obtain a raw material composition. A crystalline sulfide solid electrolyte material was obtained in the same manner as Example 8 except for using this raw material composition. The composition of the obtained sulfide solid electrolyte material is $Li_{3.75}Ge_{0.25}Al_{0.25}P_{0.5}S_4$.

Example 10

Lithium sulfide ($Li_2S$), phosphorus pentasulfide ($P_2S_5$), zirconium sulfide ($ZrS_2$) and germanium sulfide ($GeS_2$) were used as a starting material. These powders were mixed in a glove box under an argon atmosphere at a ratio of $Li_2S$ of 0.769424 g, $P_2S_5$ of 0.5751 g, $ZrS_2$ of 0.327191 g and $GeS_2$ of 0.371649 g to obtain a raw material composition. A crystalline sulfide solid electrolyte material was obtained in the same manner as Example 8 except for using this raw material composition. The composition of the obtained sulfide solid electrolyte material is $Li_{3.5}Ge_{0.25}Zr_{0.25}P_{0.5}S_4$.

Example 11

Lithium sulfide ($Li_2S$), zinc sulfide ($ZnS$), phosphorus pentasulfide ($P_2S_5$) and germanium sulfide ($GeS_2$) were used as a starting material. These powders were mixed in a glove box under an argon atmosphere at a ratio of $Li_2S$ of 0.687245 g, $ZnS$ of 0.146712 g, $P_2S_5$ of 0.522737 g and $GeS_2$ of 0.643307 g to obtain a raw material composition. A crystalline sulfide solid electrolyte material was obtained in the same manner as Example 8 except for using this raw material composition. The composition of the obtained sulfide solid electrolyte material is $Li_{3.18}Zn_{0.16}Ge_{0.5}P_{0.5}S_4$.

Example 12

Lithium sulfide ($Li_2S$), phosphorus pentasulfide ($P_2S_5$) niobium sulfide ($NbS_2$) and germanium sulfide ($GeS_2$) were used as a starting material. These powders were mixed in a glove box under an argon atmosphere at a ratio of $Li_2S$ of 0.76787 g, $P_2S_5$ of 0.53066 g, $NbS_2$ of 0.374919 g and $GeS_2$ of 0.326533 g to obtain a raw material composition. A crystalline sulfide solid electrolyte material was obtained in the same manner as Example 8 except for using this raw material composition. The composition of the obtained sulfide solid electrolyte material is $Li_{3.5}Ge_{0.25}Nb_{0.25}P_{0.5}S_4$.

Example 13

Lithium sulfide ($Li_2S$), phosphorus pentasulfide ($P_2S_5$), silicon sulfide ($SiS_2$) and germanium sulfide ($GeS_2$) were used as a starting material. These powders were mixed in a glove box under an argon atmosphere at a ratio of $Li_2S$ of 0.81323 g, $P_2S_5$ of 0.76333 g, $SiS_2$ of 0.170524 g and $GeS_2$ of 0.252913 g to obtain a raw material composition. A crystalline sulfide solid electrolyte material was obtained in the same manner as Example 8 except for using this raw material composition and shifting the maximum temperature of heat treatment from 550° C. to 650° C. The composition of the obtained sulfide solid electrolyte material is $Li_{3.55}Ge_{0.175}Si_{0.175}P_{0.65}S_4$.

[Evaluations 4]

(X-Ray Diffraction Measurement)

X-ray diffraction measurement (using a CuKα line) was performed by using the sulfide solid electrolyte materials obtained in Examples 8 to 13. The results are shown in FIGS. 20 and 21. Also, a diffraction intensity at a peak around 2θ29.58° was represented by $I_A$, an intensity at a peak around 2θ=27.33° was represented by $I_B$, and the $I_B/I_A$ value was measured. The results are shown in Table 3.

TABLE 3

| | Composition | $I_B/I_A$ |
|---|---|---|
| Example 8 | $Li_{3.75}Ge_{0.25}P(III)_{0.25}P(V)_{0.5}S_4$ | 0 |
| Example 9 | $Li_{3.75}Ge_{0.25}Al_{0.25}P_{0.5}S_4$ | 0 |
| Example 10 | $Li_{3.5}Ge_{0.25}Zr_{0.25}P_{0.5}S_4$ | 0 |
| Example 11 | $Li_{3.18}Zn_{0.16}Ge_{0.5}P_{0.5}S_4$ | 0.15 |
| Example 12 | $Li_{3.5}Ge_{0.25}Nb_{0.25}P_{0.5}S_4$ | 0.14 |
| Example 13 | $Li_{3.55}Ge_{0.175}Si_{0.175}P_{0.65}S_4$ | 0 |

As shown in FIGS. 20 and 21, any of the sulfide solid electrolyte materials obtained in Examples 8 to 13 had a great peak around 2θ=29.58°. Also, as shown in Table 3, in Example 8, the intensity at a peak around 2θ=27.33° was not detected to offer $I_B/I_A=0$. It was confirmed from this result that a crystal phase high in ion conductivity (the crystal phase A) was precipitated even though part of Ge in the LiGePS system was substituted with trivalent P. In Example 9, the intensity at a peak around 2θ=27.33° was not detected to offer $I_B/I_A=0$. It was confirmed from this result that a crystal phase high in ion conductivity (the crystal phase A) was precipitated even though part of Ge in the LiGePS system was substituted with Al. In Example 10, the intensity at a peak around 2θ=27.33° was not detected to offer $I_B/I_A=0$. It was confirmed from this result that a crystal phase high in ion conductivity (the crystal phase A) was precipitated even though part of Ge in the LiGePS system was substituted with Zr. In Example 11, the intensity at a peak around 2θ=27.33° was detected to offer $I_B/I_A=0.15$. It was confirmed from this result that a crystal phase high in ion conductivity (the crystal phase A) was precipitated in large amounts even though part of Li in the LiGePS system was substituted with Zn. In Example 12, the intensity at a peak around 2θ=27.33° was detected to offer $I_B/I_A=0.14$. It was confirmed from this result that a crystal phase high in ion conductivity (the crystal phase A) was precipitated in large amounts even though part of Ge in the LiGePS system was substituted with Nb. In Example 13, the intensity at a peak around 2θ=27.33° was not detected to offer $I_B/I_A=0$. It might be confirmed from this result that a crystal phase high in ion conductivity (the crystal phase A) was precipitated even though part of Ge in the LiGePS system was substituted with Si.

Example 14

With regard to the composition of $Li_{3.5}Ge_{0.5}P_{0.5}S_4$ ($Li_{21}Ge_3P_3S_{24}$) described in Example 5, in the case of substituting Ge with Si, it was assumed by the first-principle calculation whether a predetermined crystal structure in the present invention might exist or not. The enthalpy of formation in the case of substituting Ge in the crystal with Si was calculated while regarding the heat of formation of Li metal, Ge metal, Si metal, P crystal and S crystal as a zero base.

Here, the first-principle calculation is a high-precision calculation technique which is based on a density functional theory and does not include an experience parameter. The heat of formation (the enthalpy of formation) of the crystal was calculated by using this calculation technique. Heat of formation is heat of reaction through a reaction for synthesizing a 1-mol compound from simple substances composing the substance while regarding the heat of formation of stable simple substances as a zero base. Generally, the heat of formation is denoted by enthalpy change of formation ΔHf as heat of formation under constant pressure. When enthalpy balance in a process of changing from a reactant to a product becomes a minus value, heat is emitted out of a reaction system to bring an exothermic reaction. That is, a product may exist.

(Calculation Formula of Enthalpy of Formation)

For example, in the case of $Li_{21}Ge_3P_3S_{24}$, the enthalpy of formation may be represented by the following formula.

Enthalpy of formation=$21E_{tot}$(Li metal)+
$3E_{tot}$(Ge metal)+$3E_{tot}$(P crystal)+
$24E_{tot}$(S crystal)–$E_{tot}$($Li_{21}Ge_3P_3S_{24}$ crystal)

$E_{tot}$ is energy of each one atom in the total energy of an electronic state of a crystal calculated from the first-principle calculation.

(First-Principle Calculation)

The first-principle calculation is performed in the following manner. First, a calculation model is constructed on the basis of an experimental value of lattice constant, space group and atomic coordinate of a relevant crystal. Next, lattice constant and atom position are optimized so that internal energy is locally minimized by a calculation tool for structural optimization in general first-principle calculation software (such as CASTEP and VASP). Simultaneously with this, the total energy of an electronic state of a crystal is calculated. The enthalpy of formation is calculated by the above-mentioned formula on the basis of the obtained total energy of an electronic state of each crystal. Also, as a technique for the first-principle calculation, a plane wave base is used for the description of an electron wave function, a general gradient approximation (GGA-PBE) is used for an exchange interaction, and a PAW method is used for the handling of an inner-shell electron. The calculation conditions are optimized in each crystal.

Examples 15 to 19

With regard to the composition of $Li_{3.5}Ge_{0.5}P_{0.5}S_4$ ($Li_{21}Ge_3P_3S_{24}$) described in Example 5, in the case of substituting Ge with each of Sn, Pb, Zr, Al and B, it was assumed by the first-principle calculation whether a predetermined crystal structure in the present invention might exist or not. Examples 18 and 19 are results in the case of adding Li.

[Evaluations 5]

The results of the first-principle calculation are shown in Table 4.

TABLE 4

| | | One-atom substitution | Two-atom substitution | All-atom substitution |
|---|---|---|---|---|
| Example 14 | Substitution of Ge Composition Enthalpy of formation | $Li_{21}Ge_2Si_1P_3S_4$ –56.68 | $Li_{21}Ge_1Si_2P_3S_4$ –57.79 | $Li_{21}Si_3P_3S_4$ –59.69 |
| Example 15 | Substitution of Ge Composition Enthalpy of formation | $Li_{21}Ge_2Sn_1P_3S_4$ –54.75 | $Li_{21}Ge_1Sn_2P_3S_4$ –54.66 | $Li_{21}Sn_3P_3S_4$ –53.91 |
| Example 16 | Substitution of Ge Composition Enthalpy of formation | $Li_{21}Ge_2Pb_1P_3S_4$ –53.43 | $Li_{21}Ge_1Pb_2P_3S_4$ –51.92 | $Li_{21}Pb_3P_3S_4$ –55.34 |
| Example 17 | Substitution of Ge Composition Enthalpy of formation | $Li_{21}Ge_2Zr_1P_3S_4$ –58.22 | $Li_{21}Ge_1Zr_2P_3S_4$ –60.94 | $Li_{21}Zr_3P_3S_4$ — |
| Example 18 | Substitution of Ge Composition Enthalpy of formation | $Li_{22}Ge_2Al_1P_3S_4$ — | $Li_{23}Ge_1Al_2P_3S_4$ –48.77 | $Li_{24}Al_3P_3S_4$ –68.80 |
| Example 19 | Substitution of Ge Composition Enthalpy of formation | $Li_{22}Ge_2B_1P_3S_4$ –46.21 | $Li_{23}Ge_1B_2P_3S_4$ –49.76 | $Li_{24}B_3P_3S_4$ –16.80 |

As shown in Table 4, each enthalpy of formation became minus. This suggests that a desired crystal may be synthesized in the case of substituting Ge with each of the above-mentioned elements.

| | Reference Signs List |
|---|---|
| 1 | Cathode active material layer |
| 2 | Anode active material layer |
| 3 | Electrolyte layer |
| 4 | Cathode current collector |
| 5 | Anode current collector |
| 6 | Battery case |
| 10 | Battery |

The invention claimed is:

1. A sulfide solid electrolyte material comprising an $M_1$ element, an $M_2$ element, and an S element;
wherein $M_1$ is at least one kind selected from the group consisting of Li, Na, K, Mg, Ca and Zn; and
$M_2$ is at least one kind selected from the group consisting of P, Sb, Si, Ge, Sn, B, Al, Ga, In, Ti, Zr, V and Nb;
having a peak in positions of $2\theta=20.18°\pm0.50°$, $20.44°\pm0.50°$, $26.96°\pm0.50°$ and $29.58°\pm0.50°$ in an X-ray diffraction measurement using a CuKα line; and
having an $I_B/I_A$ value of 0.25 or less when a diffraction intensity at the peak of $2\theta=29.58°\pm0.50°$ is represented by $I_A$ and a diffraction intensity at a peak of $2\theta=27.33°\pm0.50°$ is represented by $I_B$.

2. The sulfide solid electrolyte material according to claim 1, having a peak in positions of $2\theta=17.38°$, $23.56°$, $23.96°$, $24.93°$, $29.07°$, $29.58°$, $31.71°$, $32.66°$ and $33.39°$ (these positions may be within a range of $\pm0.50°$) in the X-ray diffraction measurement using the CuKα line.

3. The sulfide solid electrolyte material according to claim 1, wherein $M_1$ is Li and $M_2$ is Ge and P.

4. The sulfide solid electrolyte material according to claim 3, having a composition of $Li_{(4-x)}Ge_{(1-x)}P_xS_4$ (x satisfies 0<x<1).

5. The sulfide solid electrolyte material according to claim 4, wherein x satisfies $0.5 \le x \le 0.8$.

6. A sulfide solid electrolyte material comprising as a main body a crystal structure having an octahedron O comprising an $M_1$ element and an S element, a tetrahedron $T_1$ comprising an $M_{2a}$ element and an S element, and a tetrahedron $T_2$ comprising an $M_{2b}$ element and an S element, in which the tetrahedron $T_1$ and the octahedron O share an edge, and the tetrahedron $T_2$ and the octahedron O share a corner; and
wherein $M_1$ is at least one kind selected from the group consisting of Li, Na, K, Mg, Ca and Zn; and
$M_{2a}$ and $M_{2b}$ are each independently at least one kind selected from the group consisting of P, Sb, Si, Ge, Sn, B, Al, Ga, In, Ti, Zr, V and Nb.

7. The sulfide solid electrolyte material according to claim 6, wherein the octahedron O is an $LiS_6$ octahedron, in which $M_1$ is Li;
the tetrahedron $T_1$ is a $GeS_4$ tetrahedron and a $PS_4$ tetrahedron, in which $M_{2a}$ is Ge and P respectively; and
the tetrahedron $T_2$ is a $PS_4$ tetrahedron, in which $M_{2b}$ is P.

8. The sulfide solid electrolyte material according to claim 6, having a peak in a position of $2\theta=29.58°\pm0.50°$ in an X-ray diffraction measurement using a CuKα line; and
having an $I_B/I_A$ value of 0.25 or less when a diffraction intensity at the peak of $2\theta=29.58°\pm0.50°$ is represented by $I_A$ and a diffraction intensity at a peak of $2\theta=27.33°\pm0.50°$ is represented by $I_B$.

9. A battery comprising: a cathode active material layer containing a cathode active material, an anode active material layer containing an anode active material, and an electrolyte layer formed between the cathode active material layer and the anode active material layer;
wherein at least one of the cathode active material layer, the anode active material layer, and the electrolyte layer contains the sulfide solid electrolyte material according to claim 1.

10. A battery comprising: a cathode active material layer containing a cathode active material, an anode active material layer containing an anode active material, and an electrolyte layer formed between the cathode active material layer and the anode active material layer;
wherein at least one of the cathode active material layer, the anode active material layer, and the electrolyte layer contains the sulfide solid electrolyte material according to claim 6.

11. The battery according to claim 9, wherein the electrolyte layer is a solid electrolyte layer containing the sulfide solid electrolyte material.

12. The battery according to claim 10, wherein the electrolyte layer is a solid electrolyte layer containing the sulfide solid electrolyte material.

13. A method for producing a sulfide solid electrolyte material, comprising the steps of:
an ion conductive material synthesizing step of synthesizing a crystalline ion conductive material by using a raw material composition containing an $M_1$ element ($M_1$ is at least one kind selected from the group consisting of Li, Na, K, Mg, Ca and Zn), an $M_2$ element ($M_2$ is at least one kind selected from the group consisting of P, Sb, Si, Ge, Sn, B, Al, Ga, In, Ti, Zr, V and Nb), and an S element;
a crystallinity decreasing step of decreasing crystallinity of the ion conductive material by mechanical milling; and
a heating step of heating the ion conductive material with the crystallinity decreased to obtain a sulfide solid electrolyte material having a peak in positions of $2\theta=20.18°\pm0.50°$, $20.44°\pm0.50°$, $26.96°\pm0.50°$ and $29.58°\pm0.50°$ in an X-ray diffraction measurement using a CuKα line, and having an $I_B/I_A$ value of 0.25 or less when a diffraction intensity at the peak of $2\theta=29.58°\pm0.50°$ is represented by $I_A$ and a diffraction intensity at a peak of $2\theta=27.33°\pm0.50°$ is represented by $I_B$.

14. The method for producing a sulfide solid electrolyte material according to claim 13, wherein the ion conductive material is synthesized by a solid phase method in the ion conductive material synthesizing step.

15. The method for producing a sulfide solid electrolyte material according to claim 13, wherein the mechanical milling is vibrating mill.

16. A method for producing a sulfide solid electrolyte material, comprising the steps of:
an ion conductive material synthesizing step of synthesizing an amorphous ion conductive material by mechanical milling by using a raw material composition containing an $M_1$ element ($M_1$ is at least one kind selected from the group consisting of Li, Na, K, Mg, Ca and Zn), an $M_2$ element ($M_2$ is at least one kind selected from the group consisting of P, Sb, Si, Ge, Sn, B, Al, Ga, In, Ti, Zr, V and Nb), and an S element; and
a heating step of heating the amorphous ion conductive material to obtain a sulfide solid electrolyte material having a peak in positions of $2\theta=20.18°\pm0.50°$, $20.44°\pm0.50°$, $26.96°\pm0.50°$ and $29.58°\pm0.50°$ in an X-ray diffraction measurement using a CuKα line, and having an $I_B/I_A$ value of 0.25 or less when a diffraction intensity at the peak of $2\theta=29.58°\pm0.50°$ is represented by $I_A$ and a diffraction intensity at a peak of $2\theta=27.33°\pm0.50°$ is represented by $I_B$.

17. The method for producing a sulfide solid electrolyte material according to claim 16, wherein the mechanical milling is ball mill or vibrating mill.

18. The method for producing a sulfide solid electrolyte material according to claim 13, wherein the raw material composition contains $Li_2S$, $P_2S_5$ and $GeS_2$.

19. The method for producing a sulfide solid electrolyte material according to claim 16, wherein the raw material composition contains $Li_2S$, $P_2S_5$ and $GeS_2$.

* * * * *